US009525823B2

(12) United States Patent
Koda et al.

(10) Patent No.: US 9,525,823 B2
(45) Date of Patent: *Dec. 20, 2016

(54) DISPLAY CONTROL APPARATUS, DISPLAY CONTROL METHOD, AND PROGRAM

(71) Applicant: SONY CORPORATION, Tokyo (JP)

(72) Inventors: Michitomo Koda, Tokyo (JP); Yoshitaka Narukawa, Saitama (JP); Hidenobu Takemura, Kanagawa (JP); Tatsunobu Koike, Kanagawa (JP); Yasufumi Suzuki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/832,245

(22) Filed: Aug. 21, 2015

(65) Prior Publication Data

US 2015/0365601 A1 Dec. 17, 2015

Related U.S. Application Data

(63) Continuation of application No. 14/271,500, filed on May 7, 2014, now Pat. No. 9,154,703, which is a (Continued)

(30) Foreign Application Priority Data

Jun. 6, 2008 (JP) ................................ 2008-149826

(51) Int. Cl.
H04N 5/232 (2006.01)
G06F 17/30 (2006.01)
H04N 5/77 (2006.01)

(52) U.S. Cl.
CPC .... *H04N 5/23293* (2013.01); *G06F 17/30038* (2013.01); *G06F 17/30053* (2013.01); *H04N 5/772* (2013.01)

(58) Field of Classification Search
CPC H04N 5/23293; H04N 2101/00; H04N 5/232; H04N 5/772; H04N 5/23241; H04N 1/00458; H04N 5/907; H04N 1/2112; H04N 1/32128; G03B 2213/025; G06F 3/016; G06F 3/011
See application file for complete search history.

(56) References Cited

U.S. PATENT DOCUMENTS 6,687,453 B1 2/2004 Sakamoto et al.
7,193,646 B1 3/2007 Shioji
(Continued)

FOREIGN PATENT DOCUMENTS

JP 2001-229176 8/2001
JP 2004-70174 3/2004
(Continued)

OTHER PUBLICATIONS

Office Action issued Aug. 23, 2011, in Japanese Patent Application No. 2008-149826.
(Continued)

*Primary Examiner* — Aung S Moe
(74) *Attorney, Agent, or Firm* — Oblon, McClelland, Maier & Neustadt, L.L.P.

(57) ABSTRACT

There is provided a display control apparatus including an external memory accommodating unit for accommodating a removable external memory; a database recognizing unit for recognizing a database stored in the external memory, the database being recorded with an image stored in the external memory and information related to the image in correspondence to each other; a display method setting unit for setting either display method of a stored first display method or a second display method of displaying the image stored in the external memory without using the database based on a recognition result of the database recognizing unit; and a display controlling unit for displaying the image stored in the external memory by the display method based on the set display method.

19 Claims, 13 Drawing Sheets

Related U.S. Application Data continuation of application No. 13/856,963, filed on Apr. 4, 2013, now Pat. No. 8,760,550, which is a continuation of application No. 12/470,925, filed on May 22, 2009, now Pat. No. 8,436,929.

(56) References Cited

U.S. PATENT DOCUMENTS

| | | |
|---|---|---|
| 7,750,967 B2 | 7/2010 | Koike et al. |
| 7,884,847 B2 | 2/2011 | Kojima et al. |
| 8,018,493 B2 | 9/2011 | Sakaue et al. |
| 8,208,040 B2 | 6/2012 | Nakase et al. |
| 8,253,807 B2 | 8/2012 | Hatanaka |
| 8,436,929 B2 | 5/2013 | Koda et al. |
| 8,760,550 B2 | 6/2014 | Koda et al. |
| 9,154,703 B2 * | 10/2015 | Koda ............... G06F 17/30038 |
| 2002/0135685 A1 | 9/2002 | Tsunoda |
| 2003/0011683 A1 | 1/2003 | Yamasaki et al. |
| 2004/0179124 A1 | 9/2004 | Morimoto et al. |
| 2005/0041035 A1 | 2/2005 | Nagatomo et al. |
| 2005/0105806 A1 * | 5/2005 | Nagaoka ........... G06F 17/30247 382/224 |
| 2006/0085474 A1 | 4/2006 | Tsubono |
| 2007/0024722 A1 | 2/2007 | Eura et al. |
| 2007/0209023 A1 | 9/2007 | Nakagawa et al. |
| 2007/0216773 A1 | 9/2007 | Kojima et al. |
| 2008/0068456 A1 | 3/2008 | Fujii et al. |
| 2009/0141315 A1 | 6/2009 | Hachiro |
| 2009/0153676 A1 | 6/2009 | Nakase et al. |
| 2009/0207279 A1 | 8/2009 | Ochi et al. |
| 2009/0220214 A1 | 9/2009 | Tomita |
| 2009/0268076 A1 | 10/2009 | Kawamura et al. |
| 2010/0253805 A1 | 10/2010 | Yasuda |
| 2011/0273471 A1 | 11/2011 | Nagasaka et al. |
| 2012/0147242 A1 | 6/2012 | Kouda et al. |
| 2013/0022294 A1 | 1/2013 | Hirayama et al. |

FOREIGN PATENT DOCUMENTS

| | | |
|---|---|---|
| JP | 2005-55743 | 3/2005 |
| JP | 2006-172249 | 6/2006 |
| JP | 2007-206918 | 8/2007 |
| JP | 2008-73882 | 4/2008 |

OTHER PUBLICATIONS

Office Action issued Aug. 10, 2010, in Japanese Patent Application No. 2008-149826.

* cited by examiner

FIG. 11

| FILE NAME | FILE PATH | ID | ATTRIBUTE | | | | | | |
|---|---|---|---|---|---|---|---|---|---|
| | | | DATE | FACE | | | DIRECTION | FAVORITE | |
| | | | | ADULT | CHILD | SMILE | | | |
| 001.jpg | C:¥101DCF¥ | 000001 | 2007/12/1 | 0 | 0 | 0 | 0 | 0 | |
| 002.jpg | C:¥101DCF¥ | 000002 | 2007/12/1 | 1 | 1 | 2 | 0 | 1 | |
| 070.jpg | C:¥201DCF¥ | 000238 | 2007/8/1 | 1 | 0 | 0 | 1 | 3 | |
| 071.jpg | C:¥201DCF¥ | 000239 | 2007/8/1 | 0 | 0 | 0 | 0 | 0 | |
| 072.jpg | C:¥201DCF¥ | 000240 | 2007/8/1 | 2 | 0 | 2 | 1 | 3 | |
| ... | ... | ... | ... | ... | ... | ... | ... | ... | |

302

DISPLAY CONTROL APPARATUS, DISPLAY CONTROL METHOD, AND PROGRAM

CROSS-REFERENCE TO RELATED APPLICATIONS

This application is a continuation application of and claims the benefit of priority under 35 U.S.C. §120 to U.S. Ser. No. 14/271,500, filed May 7, 2014, which is a continuation application of U.S. Ser. No. 13/856,963, filed Apr. 4, 2013, now U.S. Pat. No. 8,760,550, which is a continuation application of U.S. Ser. No. 12/470,925, filed May 22, 2009, now U.S. Pat. No. 8,436,929, and which claims the benefit of priority under 35 U.S.C. §119 from Japanese Application No. 2008-149826, filed Jun. 6, 2008, the entire contents of each of which is incorporated herein by reference.

BACKGROUND OF THE INVENTION

Field of the Invention

The present invention relates to a display control apparatus, a display control method, and a program.

Description of the Related Art

In recent years, a device having an imaging function for imaging a still image and/or moving image such as a digital still camera, a digital video camera including a "Handycam", which trademark right is given to the applicant of the subject application, and a mobile telephone having a digital camera function is being widespread used. The frequency the user performs imaging increases and the number of imaged images also increases by providing the imaging function to the portable device such as the mobile telephone. The storage medium of the recording medium for storing the imaged images is also increasing, where great number of images can be recorded in one recording medium.

The device having such imaging function can record the imaged image in the removable recording medium such as a Memory Stick. The images recorded in the recording medium can be reproduced and the like in other devices different from the device that imaged the image by recording the images in the removable recording medium.

A technique for improving the efficiency in the process of searching and displaying a list of images recorded in the recording medium is being developed. The technique of storing a data base in which an image and information related to the image are corresponded in the recording medium to improve the efficiency in the process desired in the similarly search of images, displaying of list of images satisfying a predetermined condition and the like using a database is described Japanese Patent Application Laid-Open No. 2007-206918.

SUMMARY OF THE INVENTION

The device applied with the technique of the related art for improving the efficiency in the process of searching and displaying a list of images recorded in the recording medium, improves efficiency of the process by using the database. Thus, the device applied with the technique of the related art can provide functions such as similarly search of images and displaying of list of images satisfying a predetermined condition to the user using the relevant device, whereby the convenience of the user improves. However, the device applied with the technique of the related art may not improve the efficiency in process if the database does not exist in the recording medium, and thus the convenience of the user may not be enhanced.

The device applied with the technique of the related art may not be able to automatically display the recorded images if the database is not referenced even if the images are recorded in the recording medium. In such case, the user desirably has the device applied with the technique of the related art read out the images recorded in the recording medium through manual operation, which significantly lowers the operability of the user.

One method of enhancing the convenience of the user when the database does not exist in the recording medium includes having the device for reading out the images recorded in the recording medium perform the following processes (a) to (d).

(a) The device for reading out the images recorded in the recording medium newly creates a database if the database does not exist in the recording medium.

(b) The device for reading out the images recorded in the recording medium analyzes each image recorded in the recording medium, and derives information related to the image.

(c) The device for reading out the images recorded in the recording medium corresponds the image and the information related to the image based on the information related to the image derived in the process of (b), and registers the same in the database created in the process of (a).

(d) The device for reading out the images recorded in the recording medium selectively reads out the images recorded in the recording medium using the database registered in the process of (c).

The device for reading out the images recorded in the recording medium can improve the efficiency in process of searching and displaying a list of images using the created database by performing the processes (a) to (d). In the device for reading out the images recorded in the recording medium, the effect of enhancing the convenience of the user can be expected by performing the processes (a) to (d). Furthermore, in the device for reading out the images recorded in the recording medium, the possibility an event the database is not referenced occurs can be reduced by performing the processes (a) to (d), and thus the possibility an event the operability of the user significantly lowers occurs can also be reduced.

However, when the device for reading out the images recorded in the recording medium performs the processes (a) to (d), the device analyzes the images recorded in the recording medium and derives the information related to the image. For instance, if 10000 still images are recorded in the recording medium, the device for reading out the images recorded in the recording medium desires great amount of time for processing if it takes a few dozen minutes to simply perform the processes (a) to (c). If the processing time of a few dozen minutes is desired, the operability of the user significantly lowers even if the device for reading out the images recorded in the recording medium is able to enhance the convenience of the user by performing the processes (a) to (d).

Therefore, in the device applied with the technique of the related art to improve the efficiency in processes such as searching and displaying a list of images recorded in the recording medium, both the convenience and the operability of the user may not be enhanced when displaying the images recorded in the recording medium.

The present invention addresses the above-identified, and other issues associated with methods in related art and apparatuses, and it is desirable to provide a new and improved display control apparatus capable of enhancing both the convenience and the operability of the user when displaying the images recorded in the recording medium, a display control method, and a program.

According to an embodiment of the present invention, there is provided a display control apparatus including an external memory accommodating unit for accommodating a removable external memory; a database recognizing unit for recognizing a database stored in the external memory, the database being recorded with an image stored in the external memory and information related to the image in correspondence to each other; a display method setting unit for setting either display method of a stored first display method or a second display method of displaying the image stored in the external memory without using the database based on a recognition result of the database recognizing unit; and a display controlling unit for displaying the image stored in the external memory by the display method based on the set display method.

According to such configuration, the convenience and the operability on the user can be enhanced in displaying the image recorded in the recording medium.

According to the embodiment of the present invention described above, there is also provided a display control apparatus including an internal memory capable of storing an image and a database recorded with information related to the image, the information being in correspondence with the image; a database recognizing unit for recognizing the database stored in the internal memory; a display method setting unit for setting either display method of a stored first display method or a second display method of displaying the image stored in the internal memory without using the database based on a recognition result of the database recognizing unit; and a display controlling unit for displaying the image stored in the internal memory by the display method based on the set display method.

According to such configuration, the convenience and the operability on the user can be enhanced in displaying the image recorded in the recording medium.

According to the embodiments of the present invention described above, there is provided a display control method including the steps of: detecting an external memory accommodated in an external memory accommodating unit for accommodating a removable external memory; recognizing a database stored in the external memory detected in the detecting step, the database being recorded with an image stored in the external memory and information related to the image in correspondence to each other; setting either display method of a stored first display method or a second display method of displaying the image stored in the external memory without using the database based on a recognition result in the recognizing step; and displaying the image stored in the external memory by the display method based on the display method set in the setting step.

According to such method, the convenience and the operability on the user can be enhanced in displaying the image recorded in the recording medium.

According to the embodiments of the present invention described above, there is also provided a display control method including the steps of: recognizing a database stored in an internal memory capable of storing an image and the database, the database being recorded with information related to the image, the information being in correspondence with the image; setting either display method of a stored first display method or a second display method of displaying the image stored in the internal memory without using the database based on a recognition result in the recognizing step; and displaying the image stored in the internal memory by the display method based on the display method set in the setting step.

According to such method, the convenience and the operability on the user can be enhanced in displaying the image recorded in the recording medium.

According to the embodiments of the present invention described above, there is provided a program for causing a computer to execute the steps of: detecting an external memory accommodated in an external memory accommodating unit for accommodating a removable external memory; recognizing a database stored in the external memory detected in the detecting step, the database being recorded with an image stored in the external memory and information related to the image in correspondence to each other; setting either display method of a stored first display method or a second display method of displaying the image stored in the external memory without using the database based on a recognition result in the recognizing step; and displaying the image stored in the external memory by the display method based on the display method set in the setting step.

According to such program, the convenience and the operability on the user can be enhanced in displaying the image recorded in the recording medium.

According to the embodiments of the present invention described above, there is provided a program for causing a computer to execute the steps of: recognizing a database stored in an internal memory capable of storing an image and the database, the database being recorded with information related to the image, the information being in correspondence with the image; setting either display method of a stored first display method or a second display method of displaying the image stored in the internal memory without using the database based on a recognition result in the recognizing step; and displaying the image stored in the internal memory by the display method based on the display method set in the setting step.

According to such program, the convenience and the operability on the user can be enhanced in displaying the image recorded in the recording medium.

According to the embodiments of the present invention described above, the convenience and the operability on the user can be enhanced in displaying the image recorded in the recording medium.

BRIEF DESCRIPTION OF THE DRAWINGS

FIG. 11 is an explanatory view showing one example of a database according to the embodiment of the present invention.

DETAILED DESCRIPTION OF THE PREFERRED EMBODIMENTS

Figure 1:
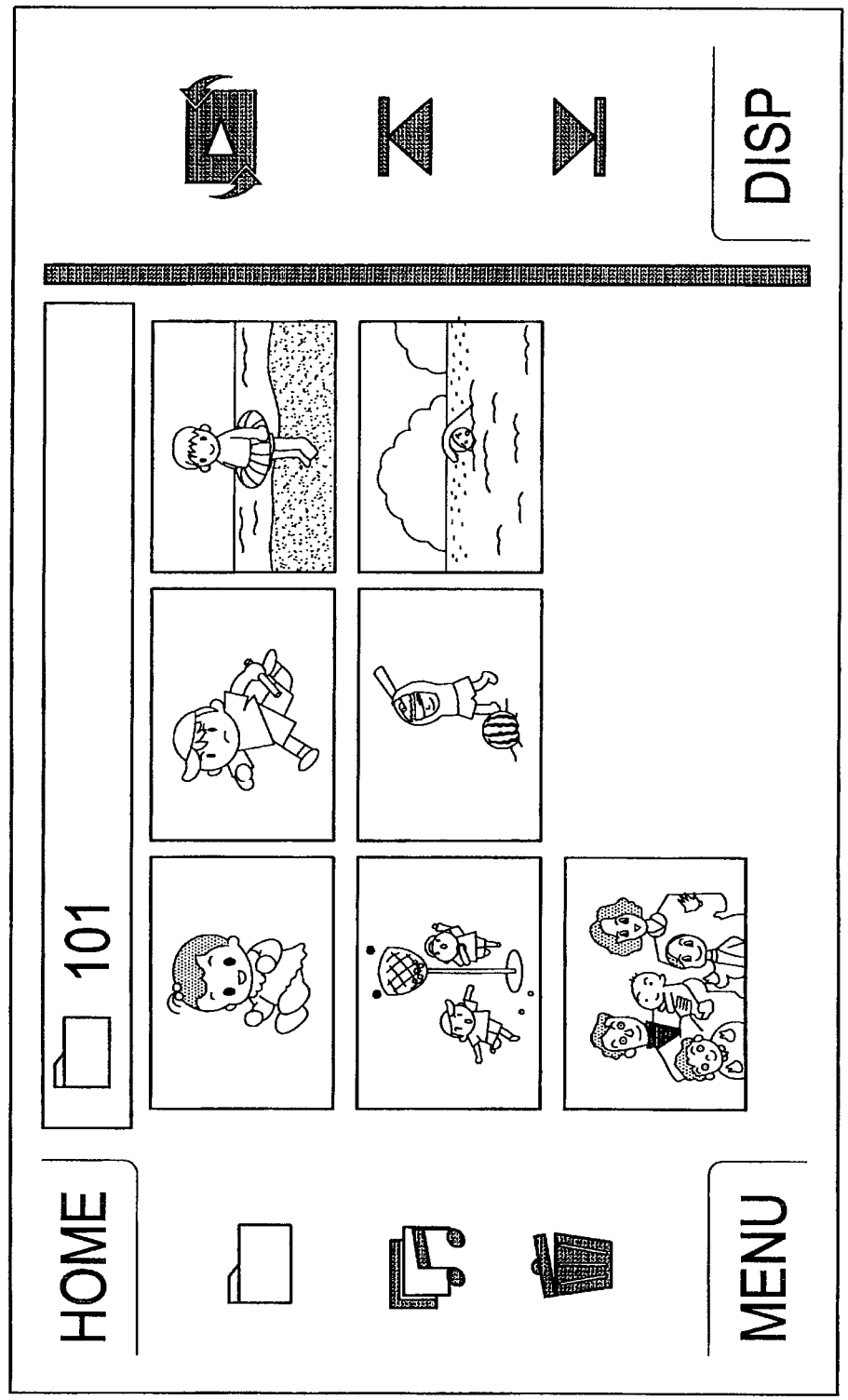
FIG. 1 is an explanatory view showing a first example of a display method according to an embodiment of the present invention.

Hereafter, preferred embodiments of the present invention will be described in detail with reference to the appended drawings. Note that in this specification and the appended drawings, structural elements that have substantially the same functions and structures are denoted with the same reference numerals and a repeated explanation of these structural elements is omitted.

The description is made in the following order.
1. Approach related to embodiment of the present invention
2. Display control apparatus according to embodiment of the present invention
3. Program related to display control apparatus according to embodiment of the present invention The recording medium for recording the images will be described below using a recording medium (hereinafter sometimes referred to as "external memory") removable from the display control apparatus and a recording medium (hereinafter referred to as "internal memory" arranged in the display control apparatus by way of example. The following description is mainly made assuming that the display control apparatus displays the images recorded in the external memory, but it is not limited thereto. The display control apparatus according to an embodiment of the present invention may display the images recorded in the internal memory similar to the images recorded in the external memory. Furthermore, the image related to the embodiment of the present invention may be a still image or a moving image.

(Approach Related to Embodiment of the Present Invention)

Prior to describing the configuration of the display control apparatus (hereinafter sometimes referred to as "display control apparatus 1000") according to an embodiment of the present invention, the approach for enhancing the convenience and the operability in the display of images recorded in the recording medium according to the embodiment of the present invention will be described.

As described above, the device applied with the technique of the related art for improving the efficiency in processes such as searching and displaying a list of images recorded in the recording medium can enhance the convenience of the user by using the database but may affect the operability. As described above, the device applied with the technique of the related art may lower the operability of the user even if the processes (a) to (c) are performed.

The display control apparatus 1000 according to the embodiment of the present invention performs the following processes (A) to (C) to enhance the convenience and the operability in the display of images recorded in the recording medium (external memory/internal memory. This is the same hereinafter).

[Outline of Process in Display Control Apparatus 1000]

(A) Recognition of Database Recorded in Recording Medium

The display control apparatus 1000 recognizes the database recorded in the recording medium based a predetermined criterion. The predetermined criterion in the display control apparatus 1000 includes, for example, "whether database is recorded in the recording medium" and "whether number of images registered in the database exceeds a predetermined number", but is not limited thereto.

(B) Setting of Display Method Based on Recognition Result of Database

The display control apparatus 1000 sets the display method (hereinafter sometimes referred to as "display mode") of the image based on the recognition result in the process of (A). More specifically, the display control apparatus 1000 sets a stored first display method if the predetermined criterion is met based on the recognition result in the process of (A). The display control apparatus 1000 sets a second display method of displaying the images stored in the recording medium without using the database if the predetermined criterion is met based on the recognition result in the process of (A).

The display control apparatus 1000 sets the stored display method (first display method) such as display method set recently if determined that the predetermined criterion is met based on the recognition result in the process of (A). Since the database can be used if the predetermined criterion is met, the display control apparatus 1000 can display the images recorded in the recording medium using the database even if the stored display method uses the database. When the first display method is set, the display control apparatus 1000 does not require great amount of time in the process as in the device for performing the processes (a) to (d) even if the stored display method uses the database. Therefore, the display control apparatus 1000 can enhance the convenience and the operability of the user in the display of images by setting the first display method.

The display control apparatus 1000 sets the display method (second display method) that does not use the database if the predetermined criterion is not met based on the recognition result in the process of (A). Therefore, in the display control apparatus 1000, an event in which the images recorded in the recording medium is not automatically displayed as in the device applied with the technique of the related art does not occur. Furthermore, in the display control apparatus 1000, great amount of time is not required for the process as in the device for performing the processes (a) to (d). Therefore, the display control apparatus 1000 can enhance the convenience and the operability of the user in the display of images even if the second display method is set.

[Example of Display Method According to Embodiment of the Present Invention]

One example of the display method according to the embodiment of the present invention is shown. The display method according to the embodiment of the present invention can be broadly classified into [B-1] display method not using database and [B-2] display method using database.

[B-1] Example of Display Method not Using Database (FIG. 1)

Figure 2:
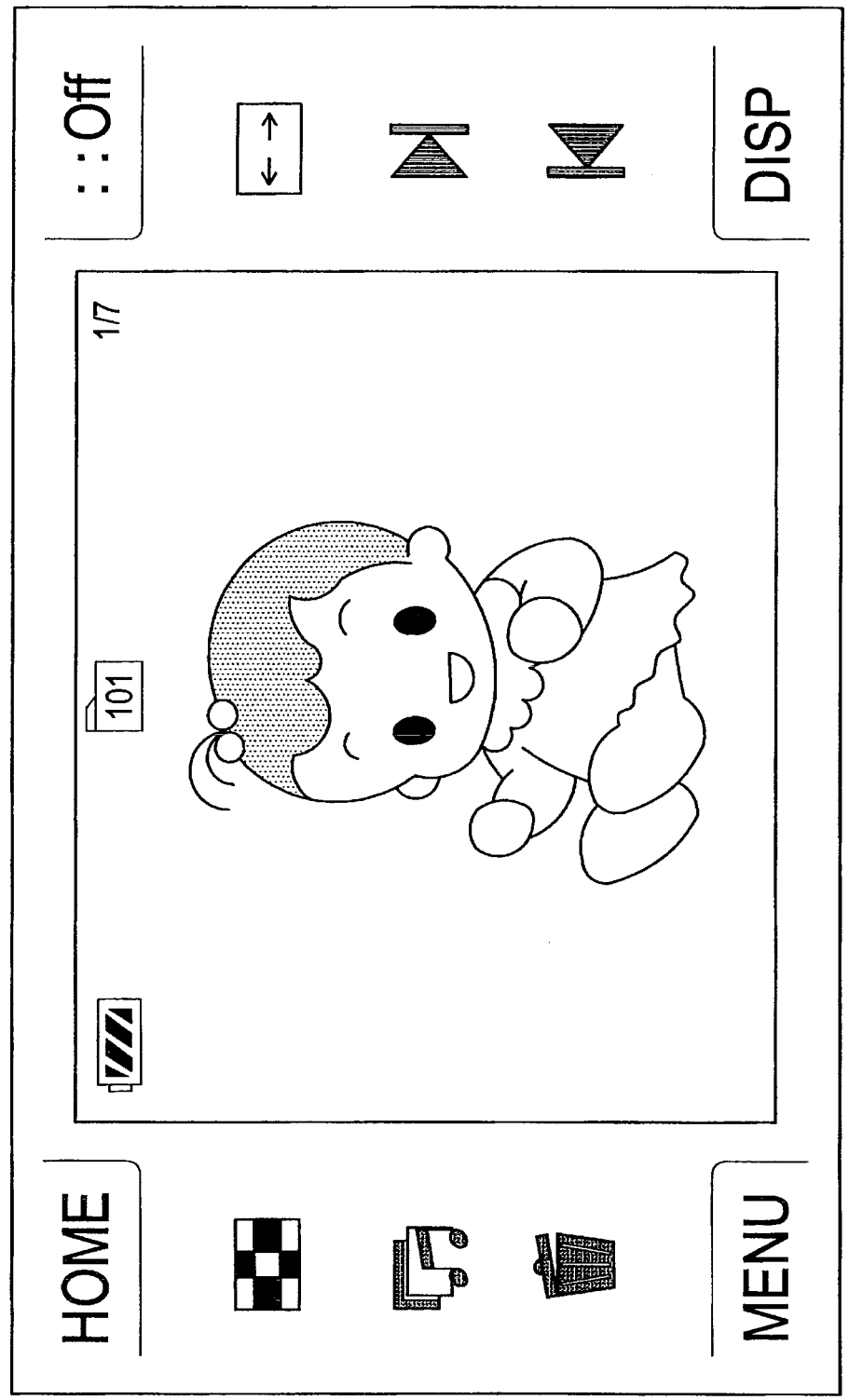
FIG. 2 is an explanatory view showing a second example of the display method according to the embodiment of the present invention.

FIG. 1 is an explanatory view showing a first example of the display method according to the embodiment of the present invention, and shows one example of the display method not using the database. FIG. 2 is an explanatory view showing a second example of the display method according to the embodiment of the present invention, and shows the display method of when the user selects one image from a list of images shown in FIG. 1.

For the display method not using the database, the display control apparatus 1000 displays, by folders, a list of images stored in a folder (or also referred to as "directory") managed according to the DCF (Design rule for Camera File system) standard and the like. FIG. 1 shows an example showing a list of images stored in a folder 101 (so-called thumbnail display). The display method of displaying the images by folders is hereinafter referred to as "folder view mode".

When the user of the display control apparatus 1000 selects one of the images (thumbnail images) shown by the folder view mode, the display control apparatus 1000 displays the selected image on the entire display screen, as shown in FIG. 2. It should be recognized that the display control apparatus 1000 can arbitrarily transition from the display state of FIG. 2 to the folder view mode shown in FIG. 1 or to other display methods to be hereinafter described in response to the operation of the user.

[B-2] Display Method of Using Database

An example of the display method using the database according to the embodiment of the present invention will be described. The display method using the database according to the embodiment of the present invention includes "date view mode", "favorite view mode", and the like.

Figure 3:
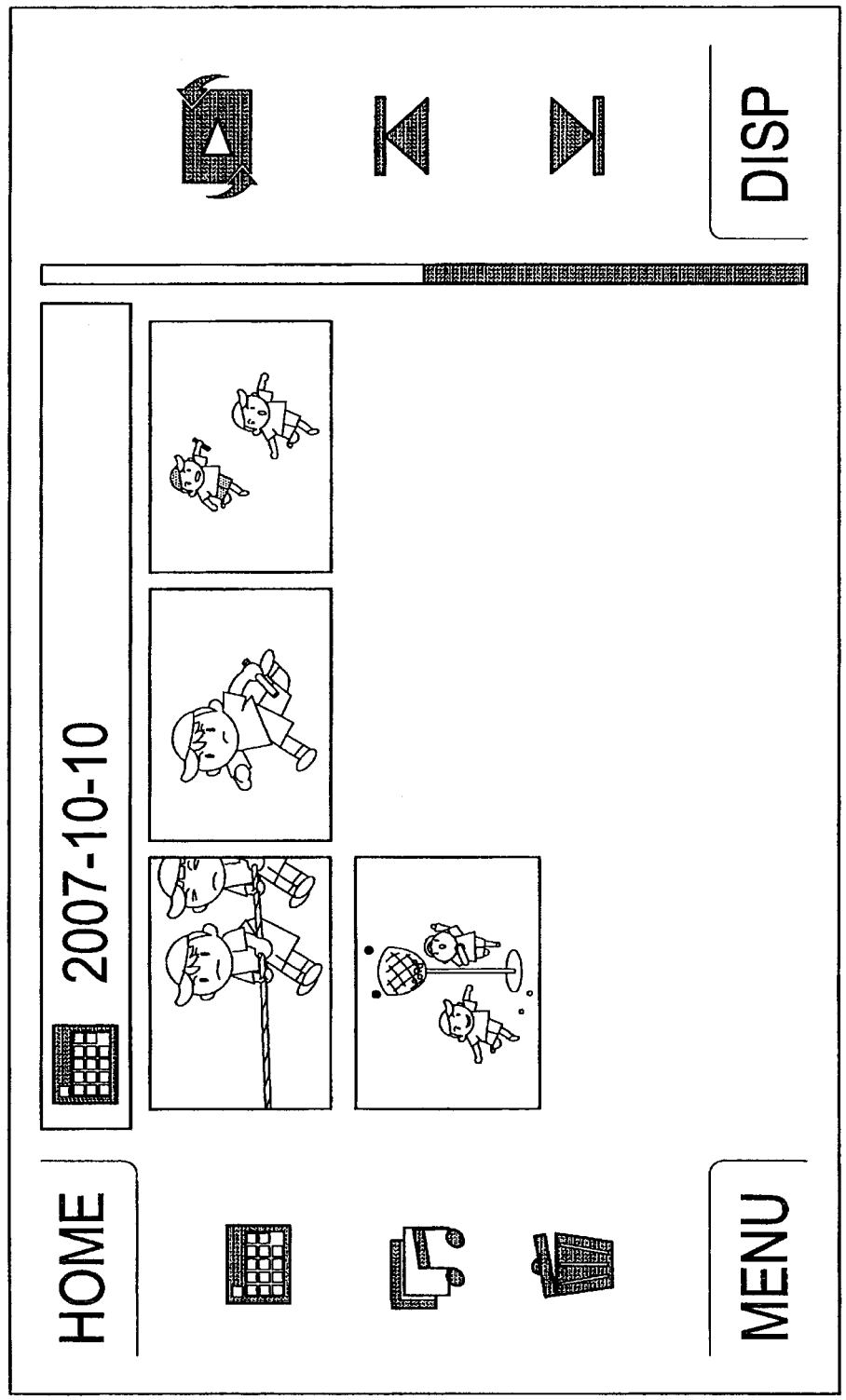
FIG. 3 is an explanatory view showing a third example of the display method according to the embodiment of the present invention.

[B-2-1] Date View Mode (FIG. 3)

FIG. 3 is an explanatory view showing a third example of the display method according to the embodiment of the present invention, where a list of images imaged on Oct. 10, 2007 is shown. As shown in FIG. 3, the display method of showing a list of images by selectively extracting images imaged on a specific date from the images recorded in the recording medium is referred to as "date view mode" in the present embodiment. The display control apparatus 1000 references the database based on the date specified by the user to realize the date view mode as shown in FIG. 3. In the database, the images recorded in the recording medium and the information (one example of information related to image) of the date on which the relevant image is imaged are corresponded and recorded. The specific example of the database according to the embodiment of the present invention will be hereinafter described.

Figure 4:
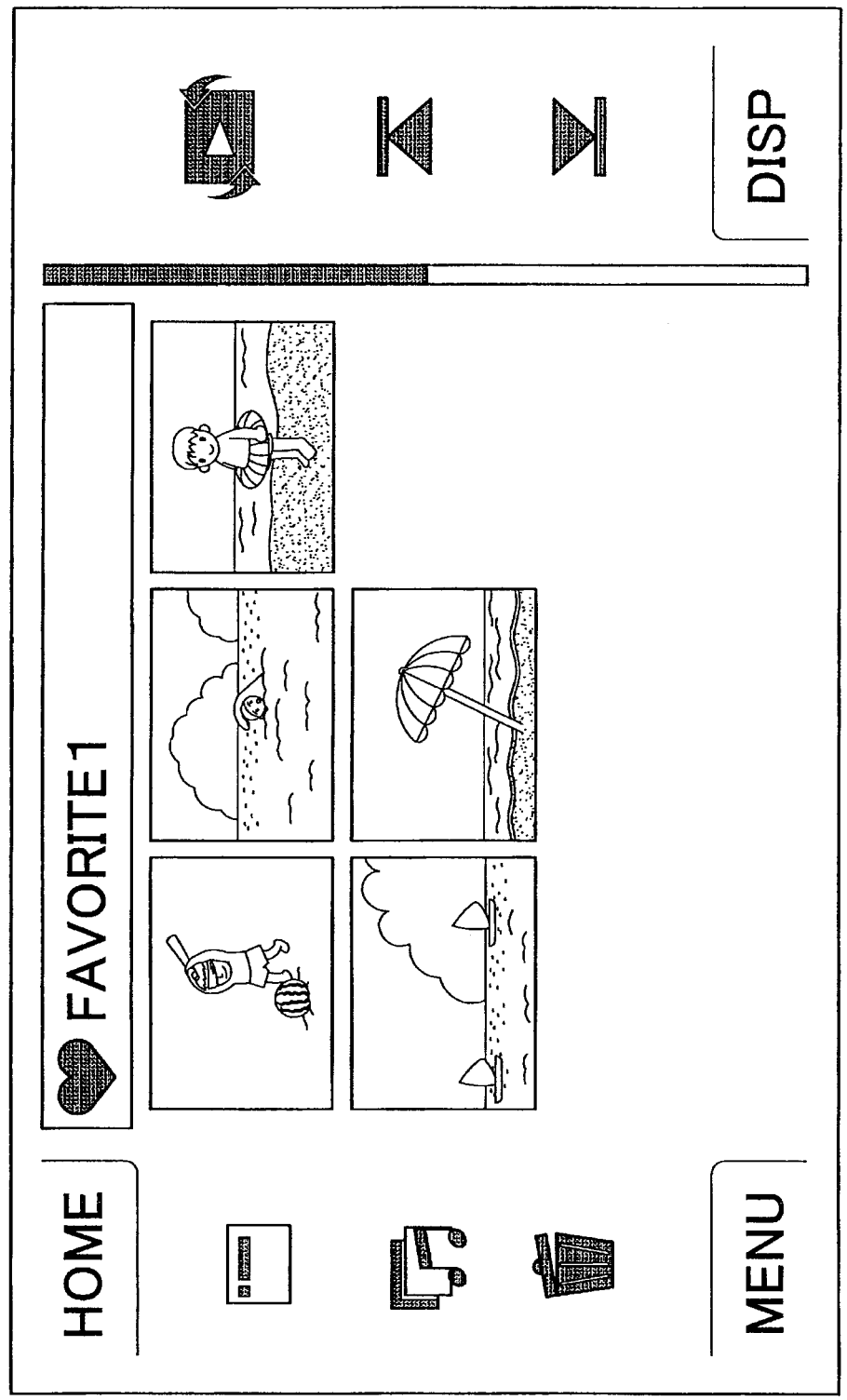
FIG. 4 is an explanatory view showing a fourth example of the display method according to the embodiment of the present invention.

[B-2-2] Favorite View Mode (FIG. 4)

FIG. 4 is an explanatory view showing a fourth example of the display method according to the embodiment of the present invention, where a list of images imaged at the beach is shown. FIG. 4 shows one example of the display screen displayed as a result of the user editing the images imaged at the beach and collecting the images in a display group "favorite 1". The display device 1000 references the database in which the images recorded in the recording medium and a flag (one example of information related to image) indicating favorite are corresponded and recorded to selectively display a specific image set with the flag. The flag indicating favorite is directly set by the user operation, but is not limited thereto, and may be indirectly set by the display control apparatus 1000 based on the condition specified by the user (e.g., "image of beach" etc.). The display method of showing a list of images set with the flag indicating favorite as shown in FIG. 4 is referred to as "favorite view mode" in the embodiment of the present invention.

The display control apparatus 1000 can display the image that matches the specific condition from the images recorded in the recording medium as in the date view mode shown in FIG. 3 and the favorite view mode shown in FIG. 4 by using the database. Therefore, the display control apparatus 1000 can enhance the convenience of the user. It should be recognized that the display method using the database according to the embodiment of the present invention is not limited to the date view mode and the favorite view mode. For instance, the display control apparatus 1000 can use the display method (so-called event view mode) of selectively displaying the image (e.g., image set with predetermined flag) imaged at a specific event for the display method using the database.

In the display control apparatus 1000, the display method as described [B-1] (folder view mode), [B-2-1] (date view mode), [B-2-2] (favorite view mode) is used. The first display method according to the embodiment of the present invention corresponds to the display method of one of [B-1] (folder view mode), [B-2-1] (date view mode), [B-2-2] (favorite view mode). The second display method according to the embodiment of the present invention is the display method of displaying without using the database, and corresponds to [B-1] (folder view mode).

(C) Display Control Based on Set Display Method

The display control apparatus 1000 controls the display of image on the display screen based on the display method (first display method/second display method) set in the process of (B).

The display control apparatus 1000 displays the images recorded in the recording medium on the display screen by the display method of either the stored first display method or the second display method not using the database by performing the processes of (A) to (C).

Here, the display control apparatus 1000 displays the image using the database when the stored display method is the display mode using the database when the first display method is set. The display control apparatus 1000 does not perform the process of registering the image in the database even if the stored display method uses the database, and thus great amount of time is not required in the process as in the device of performing the processes (a) to (d). The display control apparatus 1000 displays the images recorded in the folder by folders when the stored display method is the display mode not using the database when the first display method is set (folder view mode).

When the second display method is set, the display control apparatus 1000 does not display the image using the database. Therefore, when the second display method is set, an event where the images recorded in the recording medium is not automatically displayed as in the device applied with the technique of the related art does not occur in the display control apparatus 1000. When the second display method is set, the display control apparatus 1000 does not perform the process of registering the image in the database, and thus great amount of time is not required as in the device for performing the processes (a) to (d).

Therefore, the display control apparatus 1000 enhances the convenience and the operability of the user in the display of images by performing the processes (A) to (C).

[Details of Process in the Display Control Apparatus 1000]

The process in the display control apparatus 1000 will be specifically described below.

First Example

Figure 5:
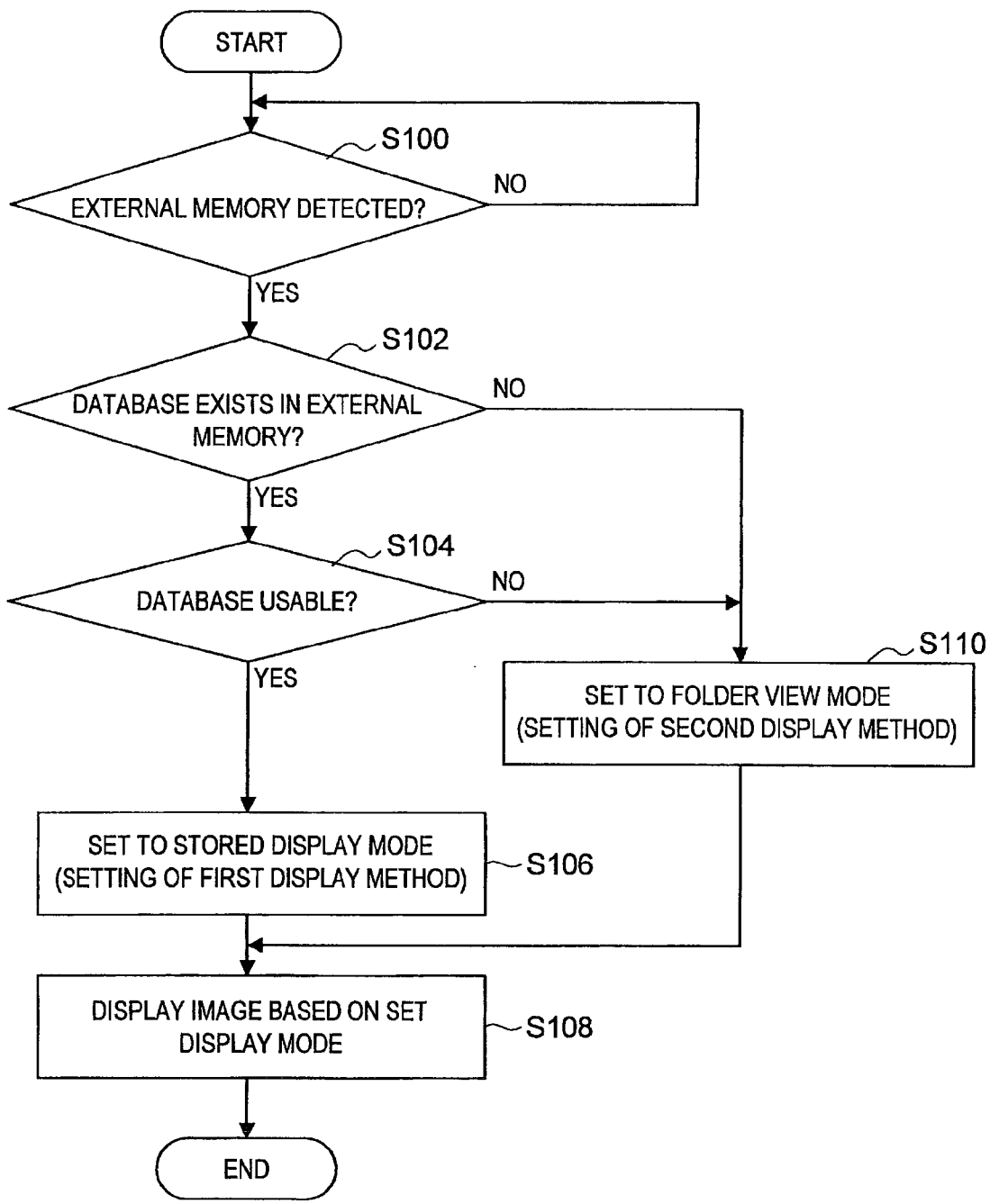
FIG. 5 is a flowchart showing a first example of the flow of process in a display control apparatus according to the embodiment of the present invention.

FIG. 5 is a flowchart showing a first example of the flow of process in the display control apparatus 1000 according to the embodiment of the present invention. FIG. 5 shows an example of the process of when the display control apparatus 1000 displays the images recorded in the external memory (recording medium).

The display control apparatus 1000 determines whether or not the external memory is detected (S100). The display control apparatus 1000 performs the determination of step S100 when the external memory is accommodated in an external memory accommodating unit based on the detection signal transmitted from the detection sensor for detecting the insertion of the external memory arranged in the external memory accommodating unit. The detection sensor may be a light detection sensor configured by a light emitting diode and a photodiode for outputting the detection signal corresponding to the received light quantity, but is not limited thereto. If the detection sensor is the light detection sensor, the signal level of the detection signal changes by the insertion of the external memory to the external memory accommodating unit, and thus the display control apparatus 1000 can perform the determination of step S100 based on the detection signal.

It should be recognized that the display control apparatus 1000 can perform the determination of step S100 not only when the external memory is accommodated in the external memory accommodating unit, but also when the user performs a predetermined operation.

The display control apparatus 1000 does not proceed the process unless determined that the external memory is detected in step S100.

If determined that the external memory is detected in step S100, the display control apparatus 1000 determines whether or not a database exists in the external memory (S102). The display control apparatus 1000 can perform the determination of step S102 depending on whether or not a file (or file group) of a predefined file name exists, but is not limited thereto.

<When Determined that Database does not Exist>

If determined that the database does not exist in the external memory in step S102, the display control apparatus 1000 sets the folder view mode (S110; setting of second display method). The display control apparatus 1000 displays the images recorded in the external memory based on the display mode set in step S110 (S108).

Although not shown in FIG. 5, the display control apparatus 1000 can store the display mode set when displaying the image in step S108 in a storage unit (hereinafter described) arranged in the display control apparatus 1000. An example where the display control apparatus 1000 stores the set display mode as "display mode holding data" in the storage unit will be described below.

Although not shown in FIG. 5, the display control apparatus 1000 can newly create a database if determined that the database does not exist in the external memory in step S102. The database created in such case corresponds to the database in the initial state in which the images recorded in the external memory is not registered.

As described above, if determined that the database does not exist in the external memory in step S102, the display control apparatus 1000 displays the image in the folder view mode (second display method) as shown in FIG. 1. Therefore, the display control apparatus 1000 can enhance the convenience and the operability of the user in displaying the image.

<When Determined that Database Exists>

If determined that the database exists in the external memory in step S102, the display control apparatus 1000 determines whether or not the database is usable (S104). Here, the display control apparatus 1000 can determine that the database is not usable based on the criterion indicated in (a) and (ii) below, but the criterion is not limited to the following.

(i) Determination Based on Version of Database (Determination Based on Compatibility)

The display control apparatus 1000 reads out from the external memory information (e.g., version number etc.) of the version set for the database recorded in the external memory. The display control apparatus 1000 then compares the version of the database indicated by the read information of the version and the version of the database to which the display control apparatus 1000 corresponds to determine whether or not the database is usable. For instance, the display control apparatus 1000 determines that the database is usable when the version of the database read out from the external memory is lower than or equal to the version of the database to which the display control apparatus 1000 corresponds. The display control apparatus 1000 determines that the database is not usable if the version of the database read out from the external memory is higher than the version of the database to which the display control apparatus 1000 corresponds.

As described above, the display control apparatus 1000 can display the images recorded in the external memory using the database to which it has compatibility by performing the determination based on the version of the database. As the display control apparatus 1000 performs the determination based on the version of the database, the display control apparatus 1000 can prevent various errors such as not being able to read out the information registered in the database or breaking the database to which it does not have compatibility.

(ii) Determination Based on Readout Result of the Database

The display control apparatus 1000 reads out the database from the external memory. The display control apparatus 1000 determines whether or not the database is usable based on whether or not the read out database is normally read out. Here, cases where the database recorded in the external memory is the file (or file group) in which only the file name is correct or where the database is altered at the binary level are given as an example in which the display control apparatus 1000 does not correctly read out the database.

As described above, the display control apparatus 1000 can prevent errors such as not being able to read out information registered in the database by performing the determination based on the readout result of the database.

If determined that the database is not usable in step S104, the display control apparatus 1000 sets the folder view mode (S110; setting of second display method). The display control apparatus 1000 then displays the images recorded in the external memory based on the display mode set in step S110 (S108).

As described above, if determined that the database is not usable in step S104, the display control apparatus 1000 displays the folder view mode (second display method) as shown in FIG. 1. Therefore, the display control apparatus 1000 can enhance the convenience and the operability of the user in displaying the image.

If determined that the database is usable in step S104, the display control apparatus 1000 sets the stored display mode (S106; setting of first display method). The display control apparatus 1000 can perform the process of step S106 based on the display mode holding data stored in the internal memory to be hereinafter described. The display mode indicated by the display mode holding data includes the folder view mode shown in FIG. 1, the date view mode shown in FIG. 3, and the favorite view mode shown in FIG. 4, but is not limited thereto.

The display control apparatus 1000 displays the images recorded in the external memory based on the display mode set in step S106 (S108).

As described above, if determined that the database is usable in step S104, the display control apparatus 1000 displays the image in the stored display mode (first display method). Therefore, the display control apparatus 1000 can enhance the convenience and the operability of the user in displaying the image.

Through the use of the processing method shown in FIG. 5, the display control apparatus 1000 can selectively set the first display method or the second display method based on the existence of the database or whether or not the database is usable, and display the images recorded in the external memory. Therefore, the display control apparatus 1000 can realize the processes (A) to (C) described above by using the processing method shown in FIG. 5, whereby the convenience and the operability of the user in displaying the image can be enhanced.

Second Example

Figure 6:
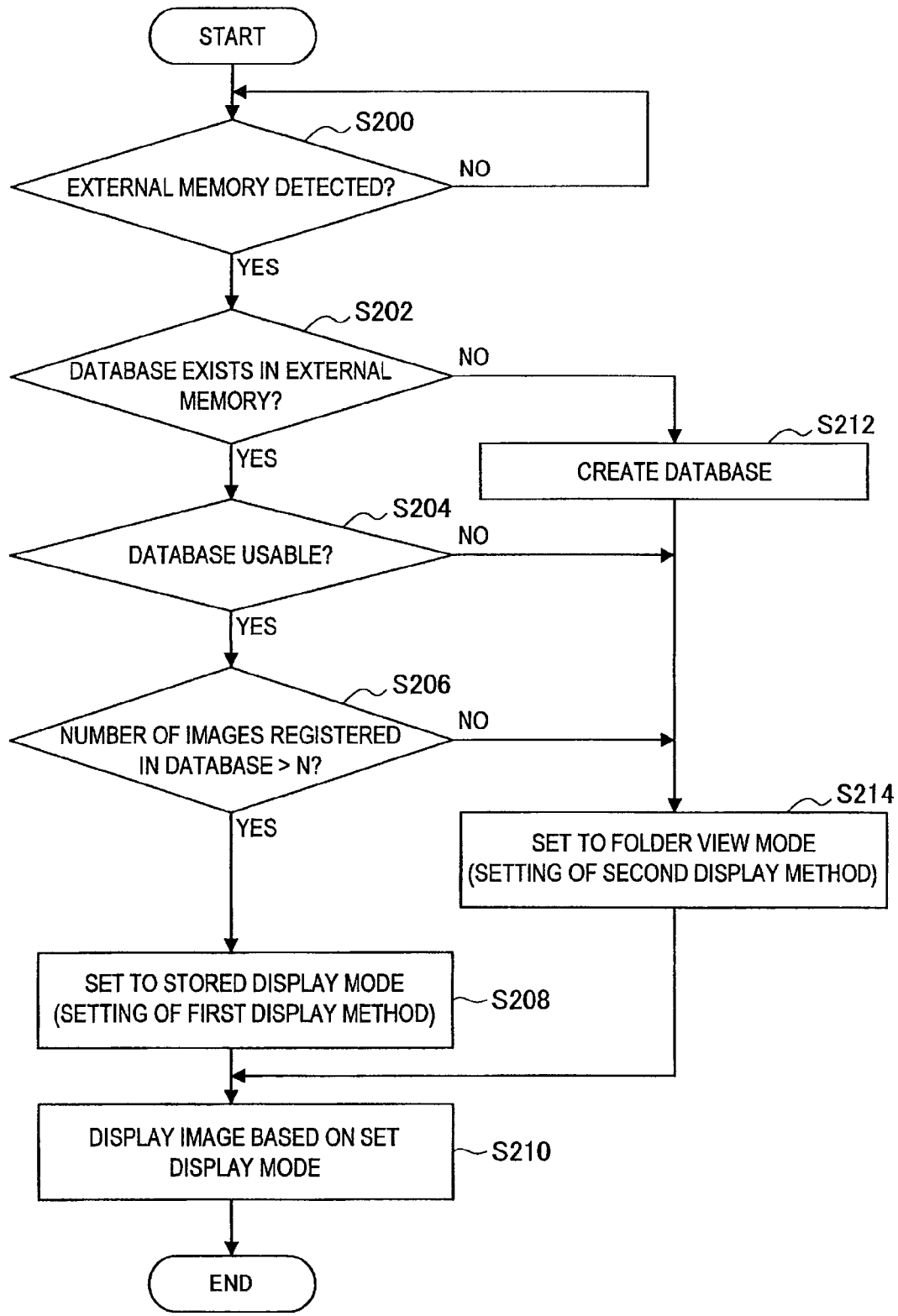
FIG. 6 is a flowchart showing a second example of the flow of process in a display control apparatus according to the embodiment of the present invention.

Through the use of the processing method shown in FIG. 5, the display control apparatus 1000 can realize the processes (A) to (C) described above. However, the processing method in the display control apparatus 1000 according to the embodiment of the present invention is not limited to the first example of the processing method shown in FIG. 5. A second example of the processing method in the display control apparatus 1000 will now be described. FIG. 6 is a flowchart showing the second example of the flow of process in the display control apparatus 1000 according to the embodiment of the present invention. Here, FIG. 6 shows an example of the process of when the display control apparatus 1000 displays the images recorded in the external memory, similar to the first example shown in FIG. 5.

Similar to step S100 shown in FIG. 5, the display control apparatus 1000 determines whether or not the external memory is detected (S200). The display control apparatus 1000 does not proceed the process unless determined that the external memory is detected in step S200.

If determined that the external memory is detected in step S200, the display control apparatus 1000 determines whether or not a database exists in the external memory (S202), similar to step S102 shown in FIG. 5.

<When Determined that Database does not Exist>

If determined that the database does not exist in the external memory in step S202, the display control apparatus 1000 newly creates the database (S212). The database created in step S212 corresponds to the database in the initial state in which the images recorded in the external memory is not registered.

When the database is created in step S212, the display control apparatus 1000 sets the folder view mode, similar to step S110 shown in FIG. 5 (S214; setting of second display method). The display control apparatus 1000 displays the images recorded in the external memory based on the display mode set in step S214 (S210).

Although not shown in FIG. 6, the display control apparatus 1000 can record the display mode set when displaying the image in step S210 in the display mode holding data.

As described above, if determined that the database does not exist in the external memory in step S202, the display control apparatus 1000 displays the image in the folder view mode (second display method) shown in FIG. 1, similar to the first example shown in FIG. 5. Therefore, the display control apparatus 1000 can enhance the convenience and the operability of the user in displaying the image.

In FIG. 6, a method in which the display control apparatus 1000 generates the database in step S212 has been shown, but it is not limited thereto. For instance, the display control apparatus 1000 may not create the database and may perform the process of step S214 if determined that the database does not exist in the external memory in step S202. It should be recognized that the display control apparatus 1000 can perform the process of step S214 even if the generation of the database fails in step S212.

<When Determined that Database Exists>

If determined that the database exists in the external memory in step S202, the display control apparatus 1000 determines whether or not the database is usable (S204), similar to step S104 of FIG. 5.

If determined that the database is not usable in step S204, the display control apparatus 1000 set the folder view mode (S214; setting of second display method). The display control apparatus 1000 displays the images recorded in the external memory based on the display mode set in step S214 (S210).

If determined that the database is not usable in step S204, the display control apparatus 1000 displays the image in the folder view mode (second display method) as shown in FIG. 1, similar to the first example shown in FIG. 5. Therefore, the display control apparatus 1000 can enhance the convenience and the operability of the user in displaying the image.

If determined that the database is usable in step S204, the display control apparatus 1000 determines whether or not "number of image registered in database >N (N is a natural number)" (S206). The value of N may be a predefined value (e.g., 0 (zero)), but is not limited thereto. For example, the display control apparatus 1000 can set the value of N to an arbitrary value according to the operation signal corresponding to the user operation transmitted from the operation unit (hereinafter described).

Therefore, the display control apparatus 1000 can prevent errors such as not being able to read out the information registered in the database as the information is not recorded by performing the determination based on the number of images registered in the database.

If determined as not "number of image registered in database >N" in step S206, the display control apparatus 1000 sets the folder view mode (S214; setting of second display method). The display control apparatus 1000 displays the images recorded in the external memory based on the display mode set in step S214 (S210).

If determined that the number of images registered in the database is not greater than a predetermined threshold value (N) in step S206, the display control apparatus 1000 displays the image in the folder view mode (second display method) as shown in FIG. 1. Therefore, the display control apparatus 1000 can enhance the convenience and the operability of the user in displaying the image.

If determined that "number of image registered in database >N" in step S206, the display control apparatus 1000 sets the stored display mode (S208; setting of first display method), similar to step S106 of FIG. 5. The display control apparatus 1000 displays the images recorded in the external memory based on the display mode set in step S208 (S210).

If determined that the number of images registered in the database is greater than a predetermined threshold value (N) in step S206, the display control apparatus 1000 displays the image in the stored display mode (first display method), similar to the first example shown in FIG. 5. Therefore, the display control apparatus 1000 can enhance the convenience and the operability of the user in displaying the image.

Through the use of the processing method shown in FIG. 6, the display control apparatus 1000 can selectively set the first display method or the second display method based on the number of images registered in the database and the like, and display the images recorded in the external memory. Therefore, the display control apparatus 1000 can realize the processes (A) to (C) described above by using the processing method shown in FIG. 6, similar to when using the processing method shown in FIG. 5, whereby the convenience and the operability of the user in displaying the image can be enhanced.

Third Example

The processing method of when the display control apparatus 1000 displays the images recorded in the external memory has been shown as the first example and the second example of the processing method in the display control apparatus 1000. However, the display control apparatus 1000 according to the embodiment of the present invention is not limited to displaying the images recorded in the external memory, and may display the images recorded in the internal memory (recording medium). The internal memory is a unique recording medium (basically recording medium that is not used when removed) arranged in the display control apparatus 1000 such as the hard disk, and the user can generally freely access the internal memory. That is, the user can perform various operations on the internal memory such as creating a folder according to the DCF standard, recording data to the internal memory, deleting the recorded data, altering the recorded data, or formatting the internal memory. Thus, even if the display control apparatus 1000 stores the database in the internal memory at one time point, the display control apparatus 1000 may not be able to display the images using the database at another time point due to formatting of the internal memory, deletion or alteration of the database, and the like. A process of when displaying the images recorded in the internal memory will now be described as a third example of the processing method in the display control apparatus 1000.

Figure 7:
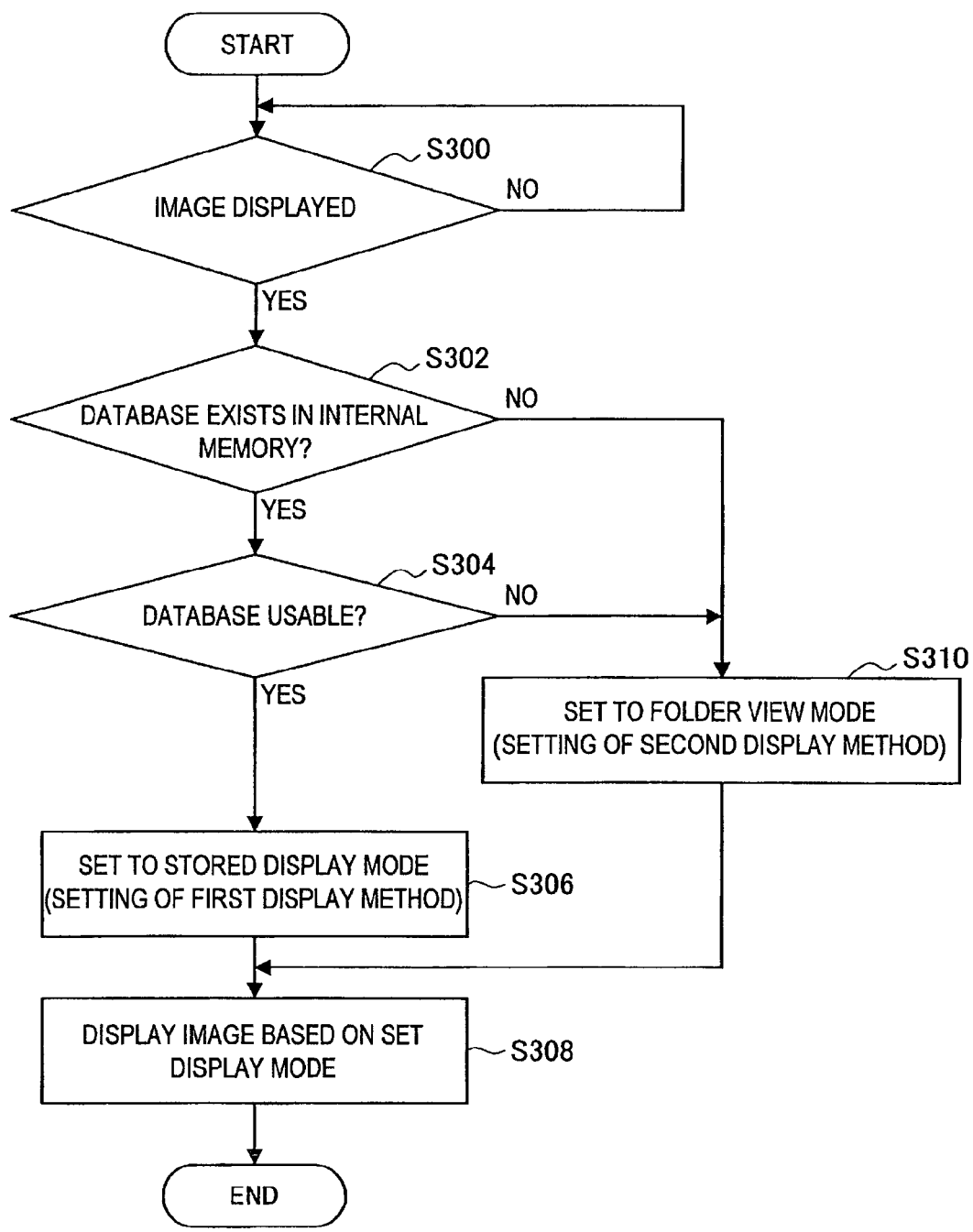
FIG. 7 is a flowchart showing a third example of the flow of process in a display control apparatus according to the embodiment of the present invention.

FIG. 7 is a flowchart showing the third example of the flow of process in the display control apparatus 1000 according to the embodiment of the present invention. Here, FIG. 7 shows an example of the process of when the display control apparatus 1000 displays the images recorded in the internal memory (recording medium).

The display control apparatus 1000 determines whether or not to display the image (S300). The display control apparatus 1000 determines to display the image when the operation state changes from the imaging mode of performing imaging to the display mode of reproducing the image, but is not limited thereto. For example, the display control apparatus 1000 may determine to display the image based on a predetermined operation signal transmitted from the operation unit (hereinafter described) according to the user operation.

If determined not to display the image in step S300, the display control apparatus 1000 does not proceed the process.

If determined to display the image in step S300, the display control apparatus 1000 determines whether or not the database exists in the internal memory (S302). The display control apparatus 1000 can perform the determination of step S302 depending on whether or not a file (or file group) of a predefined file name exists in the internal memory, but is not limited thereto. For instance, the display control apparatus 1000 recognizes the existence of the database when a predetermined state is detected, holds the recognition result, and performs the determination of step S302 based on the held recognition result. The predetermined state includes a state in which connection between the display control apparatus 1000 and an external device such as PC (Personal Computer) (e.g., USB (Universal Serial Bus) connection and network connection) is cut (canceled), but is not limited thereto.

<When Determined that Database does not Exist>

If determined that the database does not exist in the internal memory in step S302, the display control apparatus 1000 sets the folder view mode (S310; setting of second display method). The display control apparatus 1000 displays the images recorded in the internal memory based on the display mode set in step S310 (S308).

Although not shown in FIG. 7, the display control apparatus 1000 can newly create a database if determined that the database does not exist in the internal memory in step S302. The database created in such case corresponds to the database in the initial state in which the images recorded in the internal memory is not registered.

As described above, if determined that the database does not exist in the internal memory in step S302, the display control apparatus 1000 displays the image in the folder view mode (second display method) as shown in FIG. 1, similar to the first example shown in FIG. 5. Therefore, the display control apparatus 1000 can enhance the convenience and the operability of the user in displaying the image.

<When Determined that Database Exists>

If determined that the database exists in the internal memory in step S302, the display control apparatus 1000 determines whether or not the database is usable (S304). Here, the display control apparatus 1000 can determine whether or not the database recorded in the internal memory is usable similar to step S104 of FIG. 5.

If determined that the database is not usable in step S304, the display control apparatus 1000 sets the folder view mode (S310; setting of second display method). The display control apparatus 1000 displays the images recorded in the internal memory based on the display mode set in step S310 (S308).

If determined that the database is not usable in step S304, the display control apparatus 1000 displays the image in the folder view mode (second display method) as shown in FIG. 1, similar to the first example shown in FIG. 5. Therefore, the display control apparatus 1000 can enhance the convenience and the operability of the user in displaying the image.

If determined that the database is usable in step S304, the display control apparatus 1000 sets the stored display mode (S306; setting of first display method), similar to step S106 of FIG. 5. The display control apparatus 1000 can display the image recorded in the internal memory based on the display mode set in step S306 (S308).

As described, above, if determined that the database is usable in step S304, the display control apparatus 1000 displays the image in the stored display mode (first display method), similar to the first example shown in FIG. 5. Therefore, the display control apparatus 1000 can enhance the convenience and the operability of the user in displaying the image.

Through the use of the processing method shown in FIG. 7, the display control apparatus 1000 can selectively set the first display method or the second display method based on the existence of the database or whether or not the database is usable, and display the images recorded in the internal memory. Therefore, the display control apparatus 1000 can realize the processes (A) to (C) described above by using the processing method shown in FIG. 7, whereby the convenience and the operability of the user in displaying the image can be enhanced.

Fourth Example

Figure 8:
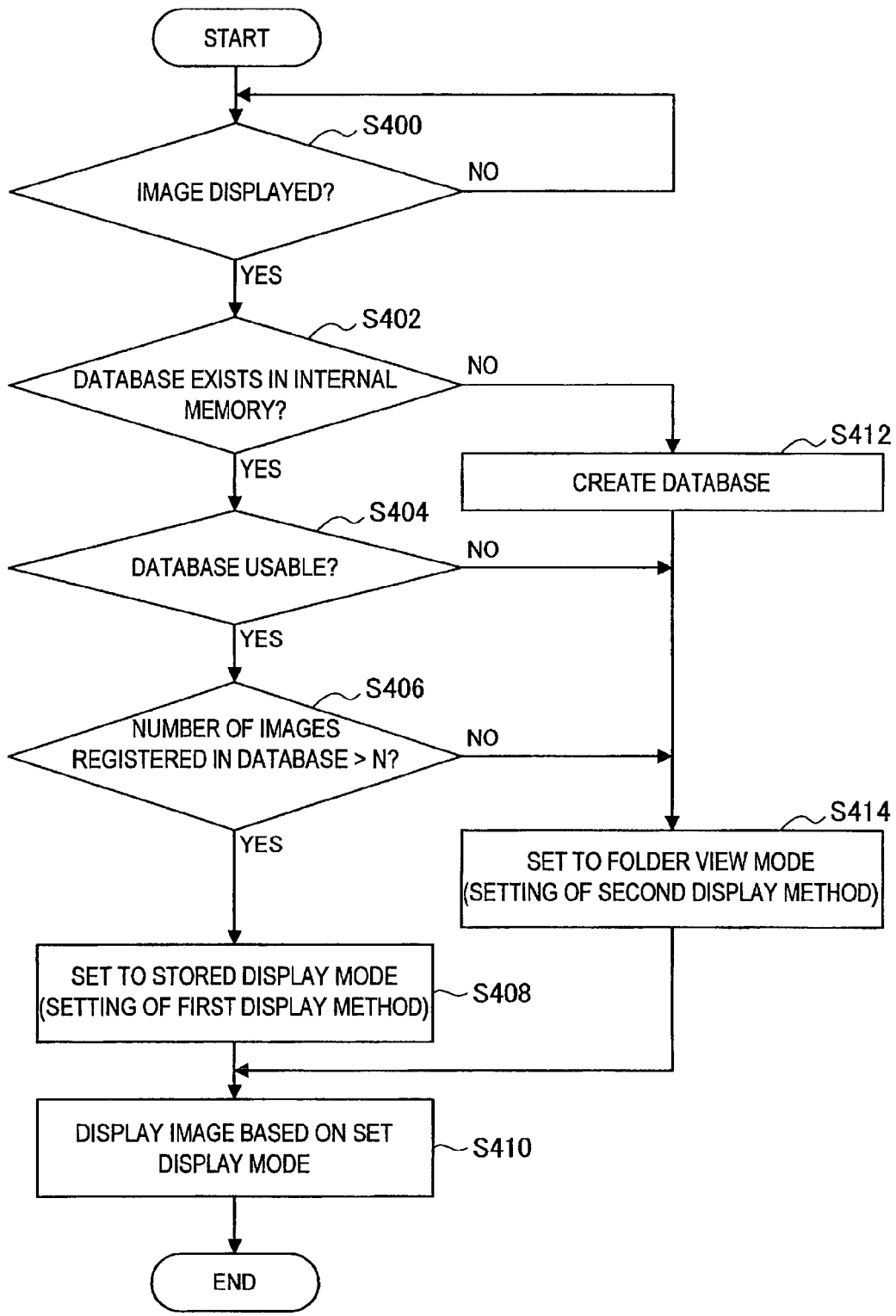
FIG. 8 is a flowchart showing a fourth example of the flow of process in the display control apparatus according to the embodiment of the present invention.

FIG. 8 is a flowchart showing a fourth example of the flow of process in the display control apparatus 1000 according to the embodiment of the present invention. Here, FIG. 8 shows an example of the process of when the display control apparatus 1000 displays the images recorded in the internal memory, similar to the third example shown in FIG. 7.

Similar to step S300 shown in FIG. 7, the display control apparatus 1000 determines whether or not to display the image (S400). If determined not to display the image in step S400, the display control apparatus 1000 does not proceed the process.

If determined to display the image in step S400, the display control apparatus 1000 determines whether or not the database exists in the internal memory (S402), similar to step S302 shown in FIG. 7.

<When Determined that Database does not Exist>

If determined that the database does not exist in the internal memory in step S402, the display control apparatus 1000 newly creates the database (S412). The database created in step S412 corresponds to the database in the initial state in which the images recorded in the internal memory is not registered.

When the database is created in step S412, the display control apparatus 1000 sets the folder view mode, similar to step S110 shown in FIG. 5 (S414; setting of second display method). The display control apparatus 1000 displays the images recorded in the internal memory based on the display mode set in step S414 (S410).

As described above, if determined that the database does not exist in the internal memory in step S402, the display control apparatus 1000 displays the image in the folder view mode (second display method) shown in FIG. 1, similar to the first example shown in FIG. 5. Therefore, the display control apparatus 1000 can enhance the convenience and the operability of the user in displaying the image.

<When Determined that Database Exists>

If determined that the database exists in the internal memory in step S402, the display control apparatus 1000 determines whether or not the database is usable (S404), similar to step S304 of FIG. 7.

If determined that the database is not usable in step S404, the display control apparatus 1000 set the folder view mode (S414; setting of second display method), similar to step S310 of FIG. 7. The display control apparatus 1000 displays the images recorded in the internal memory based on the display mode set in step S414 (S410).

If determined that the database is not usable in step S404, the display control apparatus 1000 displays the image in the folder view mode (second display method) as shown in FIG. 1, similar to the first example shown in FIG. 5. Therefore, the display control apparatus 1000 can enhance the convenience and the operability of the user in displaying the image.

If determined that the database is usable in step S404, the display control apparatus 1000 determines whether or not "number of image registered in database >N" (S406), similar to step S206 of FIG. 6.

Therefore, the display control apparatus 1000 can prevent errors such as not being able to read out the information registered in the database as the information is not recorded by performing the determination based on the number of images registered in the database, similar to the second example shown in FIG. 6.

If determined as not "number of image registered in database >N" in step S406, the display control apparatus 1000 sets the folder view mode (S414; setting of second display method), similar to step S310 of FIG. 7. The display control apparatus 1000 displays the images recorded in the internal memory based on the display mode set in step S414 (S410).

If determined that the number of images registered in the database is not greater than a predetermined threshold value (N) in step S406, the display control apparatus 1000 displays the image in the folder view mode (second display method) as shown in FIG. 1, similar to the second example shown in FIG. 6. Therefore, the display control apparatus 1000 can enhance the convenience and the operability of the user in displaying the image.

If determined that "number of image registered in database >N" in step S406, the display control apparatus 1000 sets the stored display mode (4208; setting of first display method), similar to step S106 of FIG. 5. The display control apparatus 1000 displays the images recorded in the internal memory based on the display mode set in step S408 (S410).

If determined that the number of images registered in the database is greater than a predetermined threshold value (N) in step S406, the display control apparatus 1000 displays the image in the stored display mode (first display method), similar to the first example shown in FIG. 5. Therefore, the display control apparatus 1000 can enhance the convenience and the operability of the user in displaying the image.

Through the use of the processing method shown in FIG. 8, the display control apparatus 1000 can selectively set the first display method or the second display method based on the number of images registered in the database and the like, and display the images recorded in the internal memory, similar to the second example shown in FIG. 6. Therefore, the display control apparatus 1000 can realize the processes (A) to (C) described above by using the processing method shown in FIG. 8, whereby the convenience and the operability of the user in displaying the image can be enhanced.

Therefore, the display control apparatus 1000 can realize the processes (A) to (C) described above by using the processing method shown in FIGS. 5 to 8, whereby the convenience and the operability of the user in displaying the image can be enhanced.

The processing method in the display control apparatus 1000 according to the embodiment of the present invention is not limited to the processing method shown in FIGS. 5 to 8. For instance, the display control apparatus 1000 may use the processing method in which step S104 is not performed in the processing method shown in FIG. 5, or the processing method in which step S204 is not performed in the processing method shown in FIG. 6. Similar to the processing methods shown in FIGS. 7 and 8, the display control apparatus 1000 may use the processing method in which the respective step S304, S404 is not performed. The display control apparatus 1000 can realize the processes (A) to (C) described above even by using the above processing methods, whereby the convenience and the operability of the user in displaying the image can be enhanced.

(Display Control Apparatus According to Embodiment of the Present Invention)

The configuration of the display control apparatus according to the embodiment of the present invention capable of realizing the processes (A) to (C) described above will now be described. An example where the display control apparatus according to the embodiment of the present invention has a communication function for communicating with an external device and an imaging function for imaging a still image and/or moving image will be described, but it should be recognized that the configuration of the display control apparatus according to the embodiment of the present invention is not limited thereto.

First Embodiment

Figure 9:
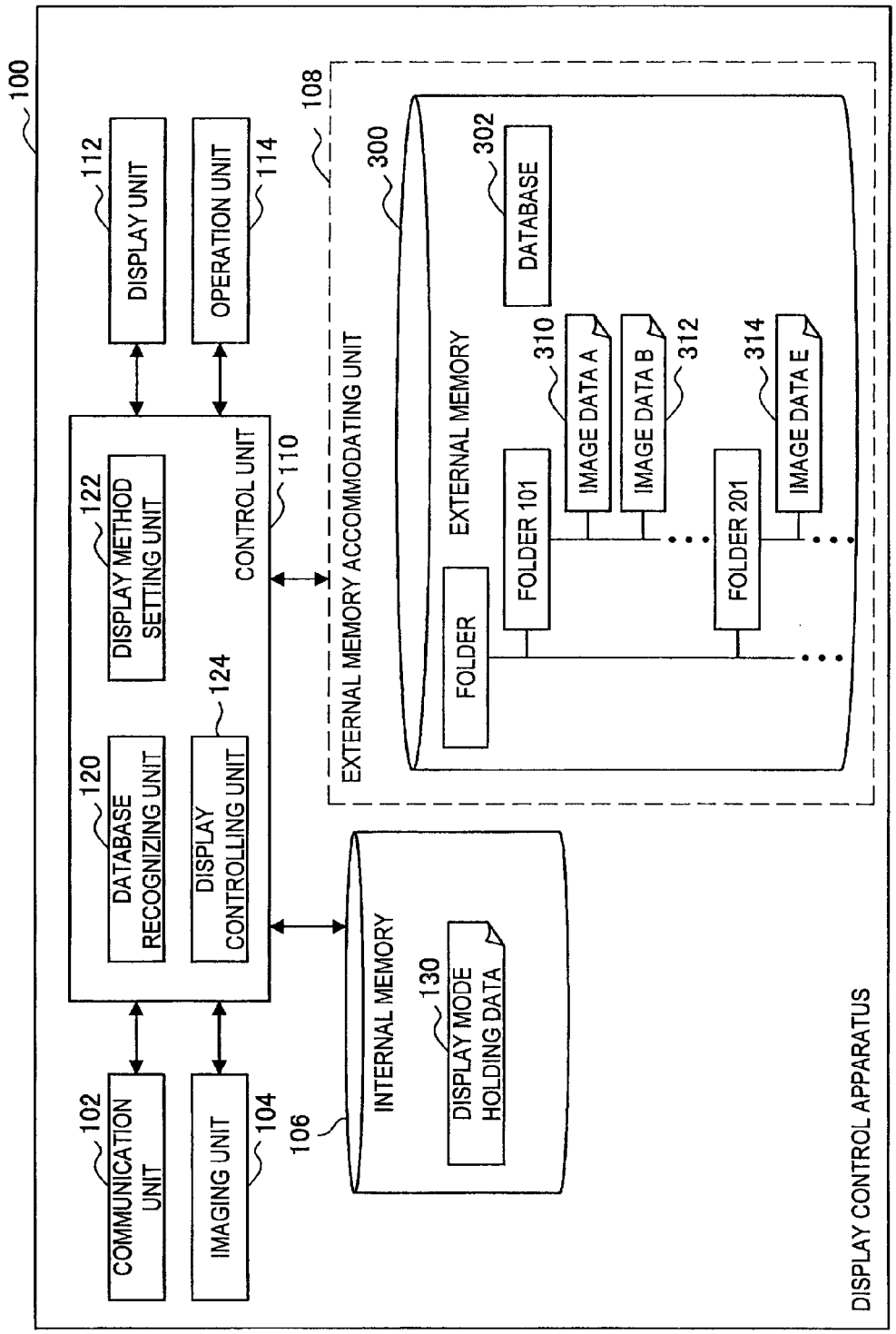
FIG. 9 is a block diagram showing one example of a configuration of a display control apparatus according to a first embodiment of the present invention.

FIG. 9 is a block diagram showing one example of a configuration of a display control apparatus 100 according to a first embodiment of the present invention. FIG. 9 shows one example of a configuration of the display control apparatus according to the embodiment of the present invention capable of enhancing the convenience and the operability of the user in displaying the images recorded in the external memory (recording medium).

With reference to FIG. 9, the display control apparatus 100 includes a communication unit 102, an imaging unit 104, an internal memory 106, an external memory accommodating unit 108, a control unit 110, a display unit 112, and an operation unit 114.

The display control apparatus 100 may include a ROM (Read Only Memory; not shown) recorded with programs and control data such as calculation parameter to be used by the control unit 110, a RAM (Random Access Memory; not shown) for primarily storing programs executed by the control unit 110, and the like. The display control apparatus 100 connects each components by a bus serving as a data transmission path.

[Hardware Configuration Example of Display Control Apparatus 100]

Figure 10:
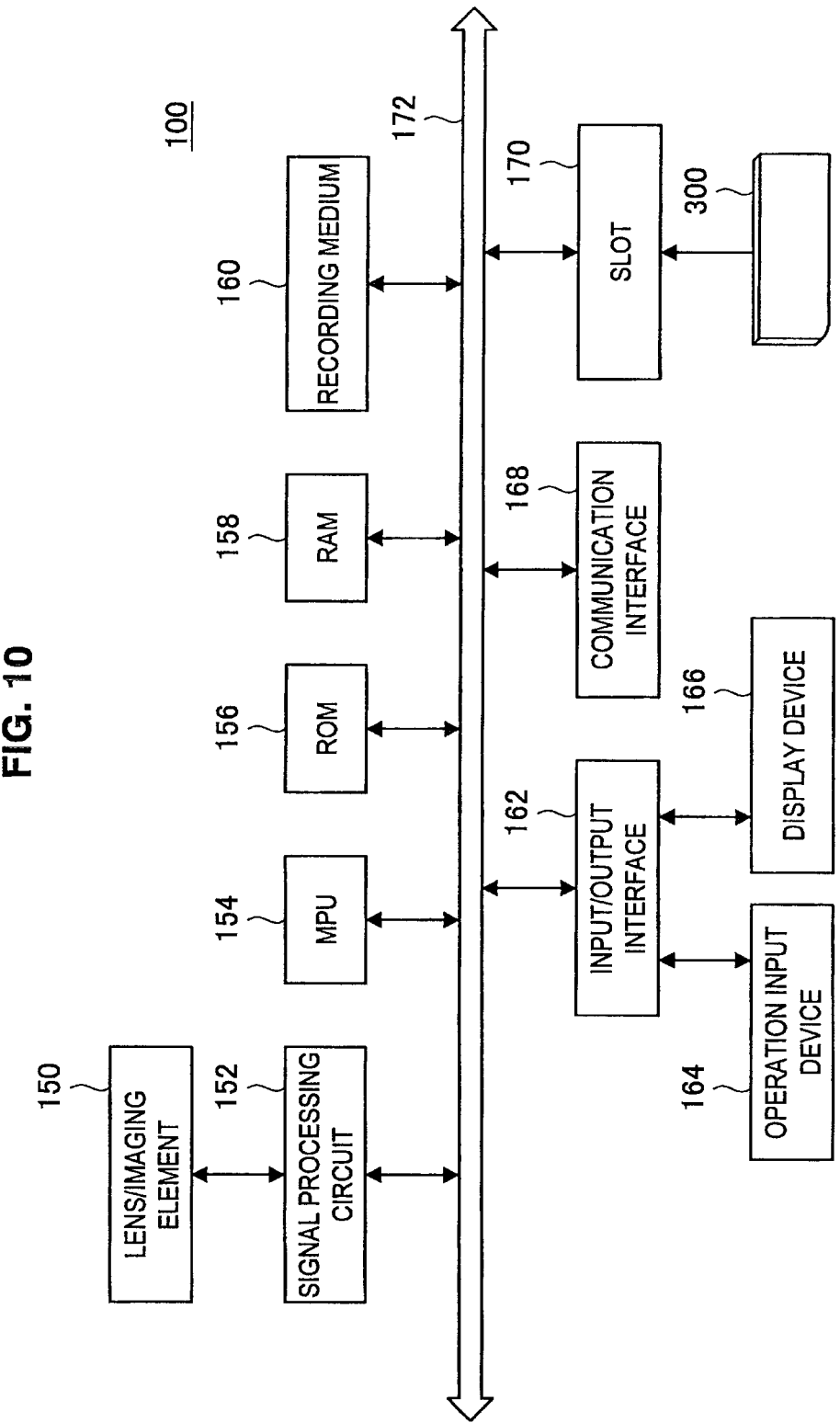
FIG. 10 is an explanatory view showing one example of hardware configuration of the display control apparatus according to the first embodiment of the present invention.

FIG. 10 is an explanatory view showing one example of hardware configuration of the display control apparatus 100 according to the first embodiment of the present invention. With reference to FIG. 10, the display control apparatus 100 includes a lens/imaging element 150, a signal processing circuit 152, an MPU 154, a ROM 156, a RAM 158, a recording medium 160, an input/output interface 162, an operation input device 164, a display device 166, a communication interface 168, and a slot 170. The display control apparatus 100 connects each components by a bus 172 serving as a data transmission path.

The lens/imaging element 150 and the signal processing circuit 152 function as the imaging unit 104. The lens/imaging element 150 is configured by an image sensor using plural lens of the optical system and the imaging element such as CCD (Charge Coupled Device) and CMOS (Complementary Metal Oxide Semiconductor). The signal processing circuit 152 includes an AGC (Automatic Gain Control) circuit and an ADC (Analog to Digital Converter), and converts the analog signal generated by the imaging element to a digital signal (image data), and performs various signal processing. The signal processing performed by the signal processing circuit 152 includes White Balance correction process, interpolation process, color tone correction process, gamma correction process, YCbCr conversion process, edge enhancement process, and Jpeg coding process, but is not limited thereto. The White Balance correction process is a process of multiplying a gain set in advance for each color of RGB (Red, Green, Blue) with respect to the RAW image data (image before signal processing) to amplify the pixel value corresponding to each pixel. The interpolation process is a process of creating the RGB of all the pixels from the Bayer array. The color tone correction process is the process of correcting the color tone of the image. The gamma correction process is a process of non-linear converting the signal of RGB, and ensuring visual linearity. The YCbCr conversion process is a process of converting the RGB to the YCbCr based on a predetermined conversion equation. Here, Y is luminance, Cb is chrominance, and Cr is chrominance. The edge enhancement process is a process of detecting the edge portion from the image, and enhancing the luminance of the detected edge portion to emphasize the contrasting density of the image. The Jpeg coding process is a process of converting the image to an image file of JPEG (Joint Photographic Experts Group) format.

The signal processing circuit 152 can perform compression process on the signal processed image data and record the same in various types of recording medium (e.g., internal memory 106, external memory 300 to be hereinafter described). Furthermore, the signal processing circuit 152 can perform decompression process on the image data read out from various types of recording medium and display the same on the display device 166 (display unit 112).

The MPU 154 functions as the control unit 110 for controlling the entire display control apparatus 100. The MPU 154 also functions as a database recognizing unit 120 described later, a display method setting unit 122, and a display controlling unit 124.

The ROM 156 stores programs and control data such as calculation parameter to be used by the MPU 154, and RAM 158 primarily stores programs and the like executed by the MPU 154.

The recording medium 160 functions as the internal memory 106, and stores the display mode holding data storing the set display mode, application, image (image data), and the like. The recording medium 160 may be a magnetic recording medium such as hard disc, non-volatile memory such as EEPROM (Electrically Erasable and Programmable Read Only Memory), flash memory, MRAM (Magnetoresistive Random Access Memory), FeRAM (Ferroelectric Random Access Memory), PRAM (Phase change Random Access Memory), and the like, but is not limited thereto.

The input/output interface 162 connects the operation input device 164 and the display device 166. The operation input device 164 functions as the operation unit 114, and the display device 166 functions as the display unit 112. The input/output interface 162 may be USB terminal, DVI (Digital Visual Interface) terminal, HDMI (High-Definition Multimedia Interface) terminal, and the like, but is not limited thereto. The operation input device 164 may be button, direction key, rotary selector such as jog dial, or combination thereof, and is arranged on the display control apparatus 100 and connected with the input/output interface 162 in the display control apparatus 100. The display device 166 includes LCD (Liquid Crystal Display) and organic EL (Electro Luminescence) display, or also referred to as OLED display (Organic Light Emitting Diode display)), and is arranged on the display control apparatus 100. The display device 166 is connected with the input/output interface 162 in the display control apparatus 100. It should be noted that the input/output interface 162 can be connected with the operation input device (e.g., keyboard and mouse) serving as the external device of the display control apparatus 100 and the display device (e.g., external display).

The communication interface 168 is a communication means of the display control apparatus 100, and functions as the communication unit 102 for performing wired/wireless communication with the external device through the network (or directly). The network may be wired network such as LAN (Local Area Network) and WAN (Wide Area Network); wireless network such as wireless WAN (WWAN; Wireless Wide Area Network) and wireless MAN (WMAN; Wireless Metropolitan Area Network) through the base station; Internet using communication protocol such as TCP/IP (Transmission Control Protocol/Internet Protocol), and the like, but is not limited thereto. The display control apparatus 100 can directly communicate with the external device by USB connection.

The communication interface 168 includes communication antenna and RF circuit (wireless communication), IEEE 802.15.1 port and transmission/reception circuit (wireless communication), IEEE 802.11b port and transmission/reception circuit (wireless communication), LAN terminal and transmission/reception circuit (wired communication), USB port and USB controller (wired communication/wireless communication), or the like, but is not limited thereto. The communication interface 168 may be configured to respond to network.

The slot 170 functions as the external memory accommodating unit 108, including an insertion port of a removable external memory, for removably accommodating the external memory 300. The external memory 300 inserted and accommodated in the slot 170 may be memory stick, SD Memory Card, and the like, but is not limited thereto. The slot 170 may be a multi-slot responding to the standards of a plurality of external memories.

The display control apparatus 100 performs the processes (A) (recognize database recorded in recording medium) to (C) (display control based on set display method) by the hardware configuration shown in FIG. 10. Therefore, the display control apparatus 100 can enhance the convenience and the operability with respect to the user in displaying the images recorded in the external memory (recording medium).

The hardware configuration of the display control apparatus 100 is not limited to the configuration shown in FIG. 10. For example, the display control apparatus 100 may realize the operation input device 164 and the display device 166 with one operation display device configured by a touch screen.

The configuration of the display control apparatus 100 will be described with reference again to FIG. 9. The communication unit 102 is a communication means of the display control apparatus 100, and performs wired/wireless communication with the external device. The communication of the communication unit 102 is controlled by the control unit 110. The display control apparatus 100 can acquire image, application, and the like from the external device, and transmit the images recorded in the external memory 300 to the external device by including the communication unit 102.

The imaging unit 104 is an imaging means of the display control apparatus 100, and can obtain image by imaging. The image obtained through imaging may be image (still image) recorded in a still image format such as LPEG and bitmap, and image (moving image) recorded in a moving image format such as WMV (Windows Media Video) and H.264/MPEG-4 AVC(H.264/Moving Picture Experts Group phase-4 Advanced Video Coding), but is not limited thereto.

The internal memory 106 is a storage means of the display control apparatus 100. The internal memory 106 stores display mode holding data storing the set display mode, application, image (image data), and the like. In FIG. 9, an example where the internal memory 106 stores the display mode holding data 130 is shown. The display control apparatus according to the embodiment of the present invention may store the database in the internal memory 106, and display the images recorded in the internal memory 106 using the database. The above-described configuration according to the embodiment of the present invention will be hereinafter described.

The internal memory 106 may be a magnetic recording medium such as hard disc, non-volatile memory such as flash memory, and the like, but is not limited thereto.

The external memory accommodating unit 108 includes an insertion port of the external memory, and removably accommodates the external memory. FIG. 9 shows an example where the external memory accommodating unit 108 is accommodating the external memory 300. An example where the external memory accommodating unit 108 accommodates one external memory 300 is shown in FIG. 9, but is not limited thereto. The external memory accommodating unit 108 may accommodate a plurality of external memories.

[External Memory 300]

The external memory 300 is a recording medium that can be removably accommodated in the display control apparatus 100, and stores various data such as image (image data) and database in which the image and the information related to the relevant image are corresponded. FIG. 9 shows an example where the external memory 300 is recorded with a database 302, image data A310, image data B312, image data E314, etc. FIG. 9 also shows an example where the image data A310 and the image data B312 are recorded in a folder 101, and the image data E314 is recorded in a folder 201. The display control apparatus 100 displays the images recorded in each folder such as the folder 101 and the folder 201 by folders when displaying the image in the folder view mode. In FIG. 9, an example where the database 302 includes one file is shown, but it is not limited thereto. For instance, the database 302 may be configured from a plurality of files (i.e., file group).

[One Example of Database 302]

FIG. 11 is an explanatory view showing one example of a database according to the embodiment of the present invention, and shows one example of the database 302 shown in FIG. 9. With reference to FIG. 11, the database according to the embodiment of the present invention includes the following information (1) to (9). The information (3) is the information for specifying the images recorded in the recording medium, and the information (1), (2), and (4) to (9) correspond to the information related to the image showing various information such as recorded area and content of the images recorded in the recording medium. The information (4) to (9) correspond to the information defining the attribute of the image.

(1) "File name" for identifying each image (duplicable identifier)

(2) "File path" indicating location where image is recorded (3) "ID" for uniquely identifying each image (unique identifier)

(4) "Date" defining the date each image is imaged (or created)

(5) "Adult" defining number of adults of the subjects contained in each image (6) "Child" defining number of children of the subjects contained in each image (7) "Smile" defining number of subjects with smiling expression of the subjects contained in each image (8) "Direction" defining direction (e.g., vertical/horizontal) the image is imaged (9) "Favorite" serving as a flag for grouping the favorite image specified by the user The information contained in the database according to the embodiment of the present invention is not limited to the information (1) to (9). For instance, the database according to the embodiment of the present invention may include information of name for identifying each "favorite" group, information for defining the number of babies of the subjects contained in each image, and the like. It should be recognized that the database structure of the database according to the embodiment of the present invention is not limited to FIG. 11.

The display control apparatus 100 can record the image data showing the image imaged by the imaging unit 104, for example in the external memory 300 by accommodating the external memory 300 in the external memory accommodating unit 108. The display control apparatus 100 can also display the images recorded in the external memory 300 in the folder view mode, the data view mode, or the favorite view mode by accommodating the external memory 300 in the external memory accommodating unit 108.

The configuration of the display control apparatus 100 will be described with reference again to FIG. 9. The control unit 110 is configured by MPU and the like, and functions to control the entire display control apparatus 100. The control unit 110 includes the database recognizing unit 120, the display method setting unit 122, and the display controlling unit 124.

The database recognizing unit 120 performs a role of performing the process (A) (recognize database recorded in recording medium), and performs the recognition of the database recorded in the external memory 300 based on a predetermined criterion. The database recognizing unit 120 selectively outputs a first recognition result for setting the first display method or a second recognition result for setting the second display method according to the result of recognition of the database. Here, the database recognizing unit 120 performs the recognition process of the database when the external memory 300 is inserted to the external memory accommodating unit 108, or when the operation state is changed from the imaging mode of performing imaging to the display mode of performing reproduction of image, but is not limited thereto. The database recognizing unit 120 may perform the recognition process of the database based on a predetermined operation signal transmitted from the operation unit 114 according to the user operation.

The display method setting unit 122 performs a role of performing the process (B) (setting of display method based on recognition result of database). More specifically, the display method setting unit 122 sets the display mode (first display method or second display method) corresponding to the recognition result in the database recognizing unit 120 based on the first recognition result or the second recognition result transmitted from the database recognizing unit 120.

The display controlling unit 124 performs a role of performing the process (C) (display control based on set display method), and controls the display of image to the display screen based on the display mode (first display method/second display method) set in the display method setting unit 122. The display controlling unit 124 may display the image on the display unit 112 or may display the image on the display device serving as an external device.

The display control apparatus 100 can perform the processes (A) to (C) by including the database recognizing unit 120, the display method setting unit 122, and the display controlling unit 124.

The display unit 112 is a displaying means arranged in the display control apparatus 100, and displays various information on the display screen. The screen displayed on the display screen of the display unit 112 includes a display screen of the image by various display modes, an operation screen for performing the desired operation on the display control apparatus 100, and the like. The display unit 112 may be an LCD, an organic EL display, and the like, but is not limited thereto. For instance, the display control apparatus 100 may configure the display unit 112 with a touch screen. In such case, the display unit 112 functions as an operation display unit enabling both user operation and display.

The operation unit 114 is an operation means of the display control apparatus 100 enabling a predetermined operation by the user. The display control apparatus 100 can perform the operation desired by the user of the display control apparatus 100 on the display control apparatus 100 by including the operation unit 114. The operation unit 114 may be an operation input device such as keyboard or mouse, button, direction key, rotary selector such as jog dial, or combination thereof, but is not limited thereto.

The display control apparatus 100 performs the process (A) (recognition of database recorded in recording medium), the process (B) (setting of display method based on recognition result of database), and the process (C) (display control based on set display method) by the above-described configuration. Therefore, the display control apparatus 100 can enhance both the convenience and the operability on the user in displaying the images recorded in the external memory (recording medium) according to the above-described configuration.

The display control apparatus 100 according to the first embodiment of the present invention recognizes the database recorded in the external memory 300 (recording medium) accommodated in the external memory accommodating unit 108, and selectively sets the first display method or the second display method based on the recognition result. The display control apparatus 100 then displays the images recorded in the external memory 300 based on the set display method (first display method or second display method).

Here, the display control apparatus 100 displays the image using the database if the display method stored when the first display method is set is the display mode using the database. In such case, the display control apparatus 100 does not perform the process of registering the images recorded in the external memory 300 in the database, and thus great amount of time is not required for the process as with the device for performing the processes (a) to (d). The display control apparatus 100 displays the images recorded in the folder by folders (folder view mode) when the display method stored when the first display method is set is the display mode not using the database.

If the second display method is set, the display control apparatus 100 does not display the images using the database. Therefore, when the second display method is set, an event in which the images recorded in the external memory 300 may not be automatically displayed does not occur in the display control apparatus 100, as with the device applied with the related art. Furthermore, when the second display method is set, the display control apparatus 100 does not perform the process of registering the images recorded in the external memory 300 in the database, and thus great amount of time is not required for the process as with the device for performing the processes (a) to (d).

Therefore, the display control apparatus 100 can enhance both the convenience and the operability on the user in displaying the images recorded in the external memory (recording medium).

Second Embodiment

In the above description, the display control apparatus 100 for controlling the display of images recorded in the external memory 300 has been described as the display control apparatus according to the embodiment of the present invention. However, the display control apparatus according to the embodiment of the present invention is not limited to the configuration of controlling the display of images recorded in the external memory 300. A display control apparatus 200 for controlling the display of images recorded in the internal memory will be described below as the display control apparatus according to a second embodiment.

Figure 12:
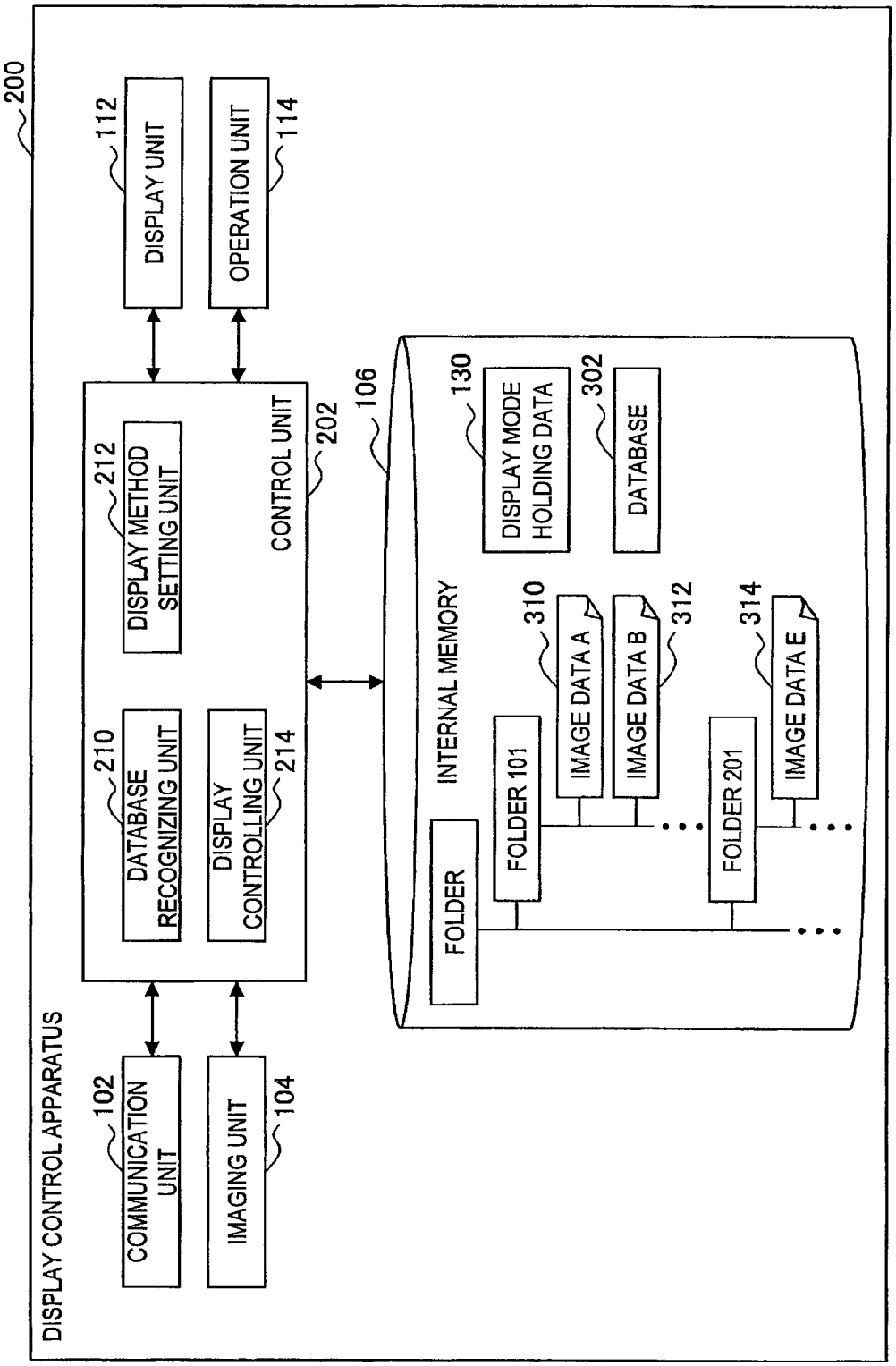
FIG. 12 is a block diagram showing one example of a configuration of a display control apparatus according to a second embodiment of the present invention.

FIG. 12 is a block diagram showing one example of a configuration of a display control apparatus 200 according to the second embodiment of the present invention. FIG. 12 shows one example of a configuration of the display control apparatus according to the embodiment of the present invention capable of enhancing the convenience and the operability of the user in displaying the images recorded in the internal memory (recording medium).

With reference to FIG. 12, the display control apparatus 200 includes the communication unit 102, the imaging unit 104, the internal memory 106, a control unit 202, the display unit 112, and the operation unit 114.

The display control apparatus 200 may include a ROM (not shown) recorded with programs and control data such as calculation parameter to be used by the control unit 202, a RAM (not shown) for primarily storing programs executed by the control unit 202, and the like. The display control apparatus 200 connects each components by a bus serving as a data transmission path.

[Hardware Configuration Example of Display Control Apparatus 200]

Figure 13:
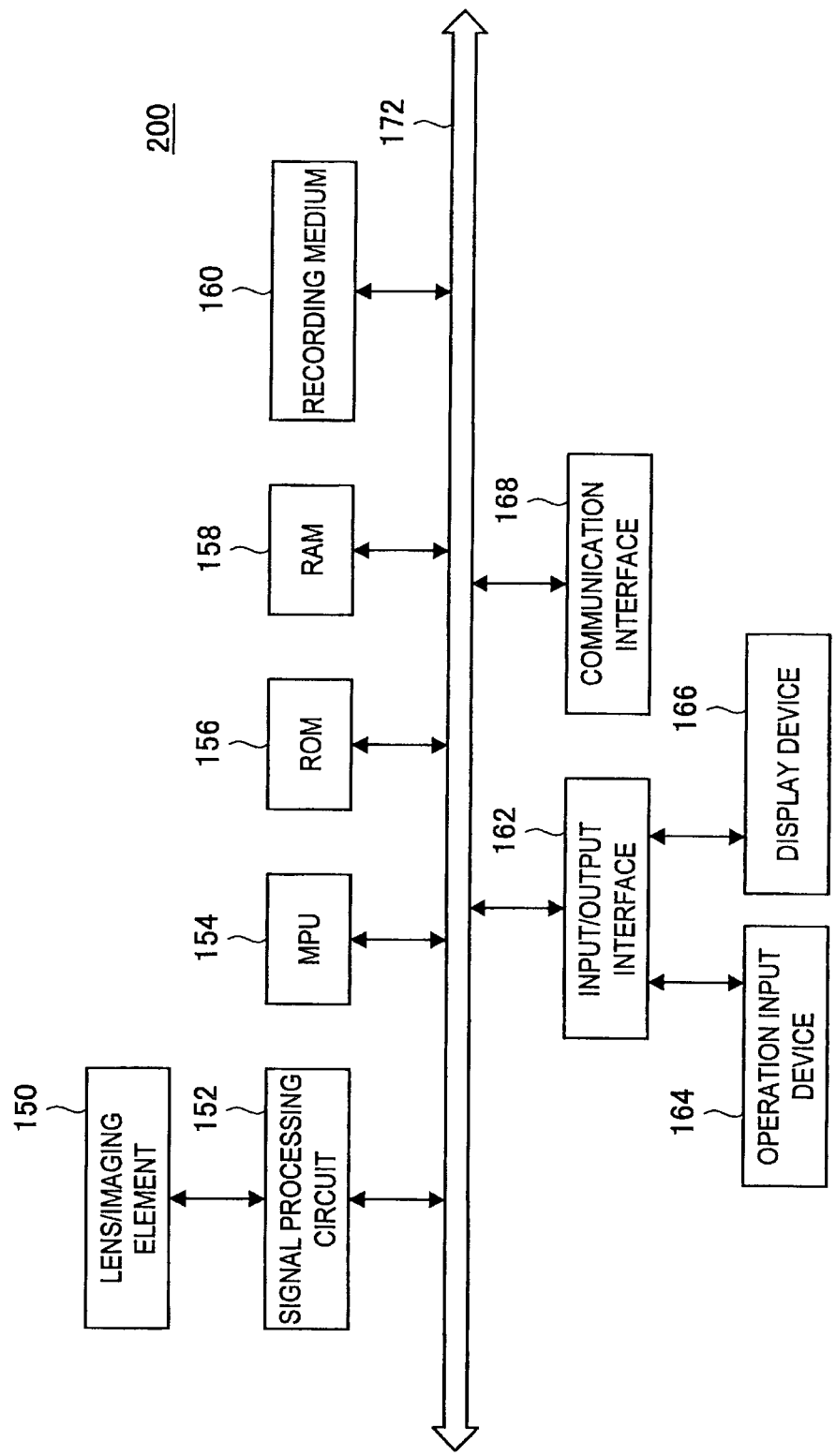
FIG. 13 is an explanatory view showing one example of hardware configuration of the display control apparatus according to the second embodiment of the present invention.

FIG. 13 is an explanatory view showing one example of hardware configuration of the display control apparatus 200 according to the second embodiment of the present invention. With reference to FIG. 13, the display control apparatus 200 includes the lens/imaging element 150, the signal processing circuit 152, the MPU 154, the ROM 156, the RAM 158, the recording medium 160, the input/output interface 162, the operation input device 164, the display device 166, the communication interface 168, and the like. The display control apparatus 200 connects each components by the bus 172 serving as a data transmission path.

The lens/imaging element 150, the signal processing circuit 152, the MPU 154, the ROM 156, the RAM 158, the recording medium 160, the input/output interface 162, the operation input device 164, the display device 166, and the communication interface 168 have configurations similar to those of the display control apparatus 100 shown in FIG. 10. Therefore, the display control apparatus 200 can perform the processes (A) (recognition of database recorded in recording medium) to (C) (display control based on set display method) by the hardware configuration shown in FIG. 13.

Therefore, the display control apparatus 200 can enhance the convenience and the operability on the user in displaying images recorded in the internal memory (recording medium) by the hardware configuration shown in FIG. 13.

The configuration of the display control apparatus 200 will be described with reference again to FIG. 12. The communication unit 102, the imaging unit 104, the display unit 112, and the operation unit 114 have configurations similar to the communication unit 102, the imaging unit 104, the display unit 112, and the operation unit 114 according to the first embodiment shown in FIG. 9.

The internal memory 106 is a storage means of the display control apparatus 200, similar to the internal memory 106 related to the first embodiment shown in FIG. 9. The internal memory 106 stores various data such as display mode holding data storing the set display mode, image (image data), database in which the image and the information related to the image are corresponded, and application. FIG. 12 shows an example where the internal memory 106 is recorded with the display mode holding data 130, the database 302, the image data A310, the image data B312, and the image data E314 . . . . Similar to the external memory 300 shown in FIG. 9, FIG. 12 shows an example where the image data A310 and the image data B312 are recorded in a folder 101, and the image data E314 is recorded in a folder 201. The display control apparatus 200 displays the images recorded in each folder such as the folder 101 and the folder 201 by folders when displaying the images in the folder view mode, similar to the display control apparatus 100 according to the first embodiment.

As described above, the display control apparatus 200 includes the internal memory 106 for storing the image (image data) and the database 302, similar to the external memory 300 shown in FIG. 9. The internal memory 106 stores the display mode holding data 130 similar to the internal memory 106 shown in FIG. 9. Therefore, the display control apparatus 200 can display the images recorded in the internal memory 106 by the folder vide mode, the date view mode, and the like, similar to the display control apparatus 100 according to the first embodiment for displaying the images recorded in the external memory 300.

The control unit 202 is configured by MPU and the like, and functions to control the entire display control apparatus 200. The control unit 202 includes a database recognizing unit 210, a display method setting unit 212, and a display controlling unit 214.

The database recognizing unit 210 performs a role of performing the process (A) (recognize database recorded in recording medium), and performs the recognition of the database recorded in the internal memory 106 based on a predetermined criterion. The database recognizing unit 210 selectively outputs a first recognition result for setting the first display method or a second recognition result for setting the second display method according to the result of recognition of the database. Here, the database recognizing unit 210 performs the recognition process of the database when the operation state is changed from the imaging mode of performing imaging to the display mode of performing reproduction of image, or based on a predetermined operation signal transmitted from the operation unit 114 according to the user operation, but is not limited thereto. For instance, the data recognizing unit 210 may perform the recognition process of the database when the connection (e.g., USB connection, network connection, etc.) with the external device is disconnected.

The display method setting unit 212 performs a role of performing the process (B) (setting of display method based on recognition result of database). More specifically, the display method setting unit 212 sets the display mode (first display method or second display method) corresponding to the recognition result in the database recognizing unit 210 based on the first recognition result or the second recognition result transmitted from the database recognizing unit 210.

The display controlling unit 214 performs a role of performing the process (C) (display control based on set display method), and controls the display of image to the display screen based on the display mode (first display method/second display method) set in the display method setting unit 212. The display controlling unit 214 may display the image on the display unit 112 or may display the image on the display device serving as an external device.

The display control apparatus 200 can perform the processes (A) to (C) by including the database recognizing unit 210, the display method setting unit 212, and the display controlling unit 214.

The display control apparatus 200 performs the process (A) (recognition of database recorded in recording medium), the process (B) (setting of display method based on recognition result of database), and the process (C) (display control based on set display method) by the above-described configuration. Therefore, the display control apparatus 200 can enhance both the convenience and the operability on the user in displaying the images recorded in the internal memory (recording medium) according to the above-described configuration.

The display control apparatus 200 according to the second embodiment of the present invention recognizes the database recorded in the internal memory 106 (recording medium), and selectively sets the first display method or the second display method based on the recognition result. The display control apparatus 200 then displays the images recorded in the internal memory 106 based on the set display method (first display method or second display method).

Here, the display control apparatus 200 displays the image using the database if the display method stored when the first display method is set is the display mode using the database, similar to the display control apparatus 100 according to the first embodiment. In such case, the display control apparatus 200 does not perform the process of registering the images recorded in the internal memory 106 in the database, and thus great amount of time is not required for the process as with the device for performing the processes (a) to (d). The display control apparatus 200 displays the images recorded in the folder by folders (folder view mode) when the display method stored when the first display method is set is the display mode not using the database, similar to the display control apparatus 100 according to the first embodiment.

If the second display method is set, the display control apparatus 200 does not display the images using the database, similar to the display control apparatus 100 according to the first embodiment. Therefore, when the second display method is set, an event in which the images recorded in the internal memory 106 is not automatically displayed does not occur in the display control apparatus 200, as with the device applied with the related art. Furthermore, when the second display method is set, the display control apparatus 200 does not perform the process of registering the images recorded in the internal memory 106 in the database, and thus great amount of time is not required for the process as with the device for performing the processes (a) to (d).

Therefore, the display control apparatus 200 can enhance both the convenience and the operability on the user in displaying the images recorded in the internal memory (recording medium).

Variant Related to Second Embodiment

In the above description, the display control apparatus 200 including only the internal memory 106 serving as the recording medium has been described as the display control apparatus according to the second embodiment. However, the configuration of the display control apparatus according to the second embodiment of the present invention is not limited to the above.

For instance, the display control apparatus according to the second embodiment may further include an external memory accommodating unit, so that the images recorded in the accommodated external memory can also be displayed, similar to the display control apparatus 100 according to the first embodiment. In this case as well, the display control apparatus according to the variant of the second embodiment can perform the process (A) (recognition of database recorded in recording medium), the process (B) (setting of display method based on recognition result of database), and the process (C) (display control based on set display method).

Therefore, the display control apparatus according to the variant of the second embodiment can enhance both the convenience and the operability on the user in displaying the images recorded in the external memory and/or the internal memory (recording medium).

The display control apparatuses 100, 200 have been described as embodiments of the present invention, but the embodiment of the present invention is not limited thereto. The embodiment of the present invention may be applied to various devices including an imaging device having an imaging function such as a digital camera and a mobile telephone with digital camera function, a computer such as PC, mobile communication device such as mobile telephone and PHS (Personal Handyphone System), an image/music reproducing device such as WALK MAN (registered trademark), and a mobile game machine such as PlayStation Portable (registered trademark).

Program Related to Display Control Apparatus of the Embodiment of the Present Invention Program Related to First Embodiment Both the convenience and the operability on the user can be enhanced in displaying the images recorded in the recording medium by a program for causing a computer to function as the display control apparatus 100 according to the first embodiment of the present invention.

Program Related to Second Embodiment

Both the convenience and the operability on the user can be enhanced in displaying the images recorded in the recording medium by a program for causing a computer to function as the display control apparatus 200 according to the second embodiment of the present invention.

It should be understood by those skilled in the art that various modifications, combinations, sub-combinations and alterations may occur depending on design requirements and other factors insofar as they are within the scope of the appended claims or the equivalents thereof.

In the description above, the provision of the program (computer program) for causing the computer to function as the display control apparatuses 100, 200 according to the embodiment of the present invention has been shown, but the embodiment of the present invention may also provide a recording medium stored with the program.

The above-described configuration shows one example of the embodiment of the present invention, and obviously pertains to the technical scope of the present invention.

What is claimed is:

1. A system comprising:
   circuitry configured to
     recognize a predetermined type of information being stored in a memory, wherein the predetermined type of information is generated based on a plurality of image data, wherein the predetermined type of information includes at least face related information of the image data, and wherein the predetermined type of information is separate from and is not attached to the image data in the memory, and
     set a first display control method that uses the predetermined type of information for displaying at least one image data based on that a first recognition result is outputted in the recognizing step and set a second display control method that does not use the predetermined type of information to generate a display screen for displaying the at least one image data based on that a second recognition result is outputted in the recognizing step.

2. The system according to claim 1, wherein the circuitry is further configured to:
   output the first recognition result for setting the first display method when the predetermined type of information is stored in the memory, and
   output the second recognition result for setting the second display method when the predetermined type of information is not stored in the memory.

3. The system according to claim 1, wherein the circuitry is further configured to:
   output the first recognition result when the predetermined type of information is stored in the memory and the predetermined type of information is usable, and
   output the second recognition result when the predetermined type of information is not usable.

4. The system according to claim 1, wherein the circuitry is further configured to:
   output the first recognition result when the predetermined type of information is stored in the memory and a number of images used for generating the predetermined type of information is greater than a predetermined number, and
   output the second recognition result when the number of images used for generating the predetermined type of information is smaller than or equal to the predetermined number.

5. The system according to claim 1, wherein the circuitry is further configured to:
   output the first recognition result for setting the first display method when the predetermined type of information is stored in the memory, when the database is usable, and when a number of images used for generating the predetermined type of information is greater than a predetermined number, and
   output the second recognition result for setting the second display method when the predetermined type of information is not stored in the memory, when the predetermined type of information is not usable, or when the number of images used for generating the predetermined type of information is smaller than or equal to the predetermined number.

6. The system according to claim 1, wherein the circuitry is further configured to set the first display method by using the face related information and favorite related information.

7. The system according to claim 1, wherein the circuitry is further configured to transition between the first display state and the second display state in response to an operation of the user.

8. The system according to claim 1, wherein the predetermined type of information itself does not include any of the plurality of image data.

9. The system according to claim 1, wherein the predetermined type of information is stored as a separate file from the plurality of image data.

10. A method, implemented by a system having circuitry, comprising:
    performing, by the circuitry, a recognizing step of recognizing a predetermined type of information being stored in a memory, wherein the predetermined type of information is generated based on a plurality of image data, wherein the predetermined type of information includes at least face related information of the image data, and wherein the predetermined type of information is separate from and is not attached to the image data in the memory, and
    setting, by the circuitry, a first display control method that uses the predetermined type of information for displaying at least one image data based on that a first recognition result is outputted in the recognizing step and set a second display control method that does not use the predetermined type of information to generate a display screen for displaying the at least one image data based on that a second recognition result is outputted in the recognizing step.

11. The method according to claim 10, further comprising:
    outputting the first recognition result for setting the first display method when the predetermined type of information is stored in the memory, and
    outputting the second recognition result for setting the second display method when the predetermined type of information is not stored in the memory.

12. The method according to claim 10, further comprising:
    outputting the first recognition result when the predetermined type of information is stored in the memory and the database is usable, and
    outputting the second recognition result when the predetermined type of information is not usable.

13. The method according to claim 10, further comprising:
    outputting the first recognition result when the predetermined type of information is stored in the memory and a number of images used to generate the predetermined type of information is greater than a predetermined number, and outputting the second recognition result when the number of images used to generate the predetermined type of information is smaller than or equal to the predetermined number.

14. The method according to claim 10, further comprising:
   outputting the first recognition result for setting the first display method when the predetermined type of information is stored in the memory, when the predetermined type of information is usable, and when a number of images used to generate the predetermined type of information is greater than a predetermined number, and
   outputting the second recognition result for setting the second display method when the predetermined type of information is not stored in the memory, when the database is not usable, or when the number of images used to generate the predetermined type of information is smaller than or equal to the predetermined number.

15. The method according to claim 10, further comprising:
   setting the first display method by using the face related information and favorite related information.

16. The method according to claim 10, further comprising:
   transitioning between the first display state and the second display state in response to an operation of the user.

17. The method according to claim 10, wherein the predetermined type of information itself does not include any of the plurality of image data.

18. The method according to claim 10, wherein the predetermined type of information is stored as a separate file from the plurality of image data.

19. A non-transitory computer readable medium storing a program that when implemented by an apparatus causes the apparatus to perform a method comprising:
   recognizing a predetermined type of information being stored in a memory, wherein the predetermined type of information is generated based on a plurality of image data, wherein the predetermined type of information includes at least face related information of the image data, and wherein the predetermined type of information is separate from and is not attached to the image data in the memory, and
   setting a first display control method that uses the predetermined type of information for displaying at least one image data based on that a first recognition result is outputted in the recognizing step and set a second display control method that does not use the predetermined type of information to generate a display screen for displaying the at least one image data based on that a second recognition result is outputted in the recognizing step.

* * * * *